United States Patent
Bahadiroglu

(12) 
(10) Patent No.: US 7,012,893 B2
(45) Date of Patent: Mar. 14, 2006

(54) ADAPTIVE CONTROL OF DATA PACKET SIZE IN NETWORKS

(75) Inventor: Murat I. Bahadiroglu, Bedford, NH (US)

(73) Assignee: Smartpackets, Inc., Manchester, NH (US)

( * ) Notice: Subject to any disclaimer, the term of this patent is extended or adjusted under 35 U.S.C. 154(b) by 848 days.

(21) Appl. No.: 09/879,761

(22) Filed: Jun. 12, 2001

(65) Prior Publication Data

US 2002/0186660 A1    Dec. 12, 2002

(51) Int. Cl.
H04L 12/26    (2006.01)

(52) U.S. Cl. ...................... 370/231; 370/236

(58) Field of Classification Search ......... 370/395.43, 370/395.42, 395.41, 238.1, 238, 237, 236.2, 370/236, 235, 233, 232, 231, 230, 229, 236.1
See application file for complete search history.

(56) References Cited

U.S. PATENT DOCUMENTS

| | | | |
|---|---|---|---|
| 5,384,770 A * | 1/1995 | Mays et al. ................. | 370/300 |
| 5,477,531 A | 12/1995 | Mc Kee et al. | |
| 6,108,382 A * | 8/2000 | Gringeri et al. ....... | 375/240.01 |
| 6,363,429 B1 * | 3/2002 | Ketcham .................... | 709/235 |
| 6,414,942 B1 * | 7/2002 | Ito et al. .................... | 370/250 |
| 6,622,172 B1 * | 9/2003 | Tam ........................... | 709/232 |
| 6,657,987 B1 * | 12/2003 | Kumar et al. ............... | 370/346 |
| 6,757,255 B1 * | 6/2004 | Aoki et al. ................. | 370/252 |
| 6,769,030 B1 * | 7/2004 | Bournas .................... | 709/233 |

FOREIGN PATENT DOCUMENTS

| | | |
|---|---|---|
| EP | 0 415 843 A2 | 3/1991 |
| EP | 0 942 560 A2 | 9/1999 |

OTHER PUBLICATIONS

Hashimoto et al., "End-to-End QoS Architecture for Continuous Media Service", Database and Expert Systems Applications, 1998. Proceedings. Ninth International Workshop on Vienna, Austria, Aug. 26-28, 1998, Los Alamitos, CA, USA, IEEE Comput. Soc, US, Aug. 26, 1998, pp. 490-495, paragraphs 0001, 04.2, 05.2.

\* cited by examiner

Primary Examiner—Kwang Bin Yao
(74) Attorney, Agent, or Firm—Davis & Bujold, P.L.L.C.

(57) ABSTRACT

An adaptive packet mechanism and method for optimizing data packet transmission through a network connection between a sending node and a receiving node. Current network conditions in the connection are periodically determined wherein the network conditions pertain to the latency and jitter of packet transmission between the sending node and receiving node. The measurements of latency and jitter are used to determine an optimum packet size and an optimum inter-packet interval for transmission of packet data between the sending node and the receiving node and are used in the transmission of data packets from the sending node to the receiving node. Network conditions may be determined by transmission of monitor or data packets and may be determined at either or both of the sending or receiving nodes and the optimum packet size and inter-packet interval are determined by a fuzzy logic analyzer, a neural network analyzer or a combined fuzzy logic/neural network analyzer.

33 Claims, 10 Drawing Sheets

Ethernet Frame (Network Layer) – TCP/IP Protocol

Test Schedule Script File 38

| Header Name | Value | Description |
|---|---|---|
| Test Type | Net Condition | Records tests of 10 28 bytes packet transmission at a specified inter-packet delay. |
| | Data Transfer | Records test of packets with a forced payload size or forced packet count at a specified inter-packet delay. |
| IP Protocol | UDP | UDP protocol provides minimal transmission delay because it excludes the connection setup process, flow control and retransmission – no error checking performance. |
| Send Mode | TXRX | Net Condition test send mode |
| Send IP Address | | Sender's IP address |
| Send IP Port | -1 | Negative number indicates IP stack chooses the sending port |
| Send Embed Offset Sec | | Padding |
| Recv Mode | Echo | Net Condition receive mode -- test always functions in a loop |
| | Recv | Data Transfer receive mode -- data is transmitted one way. |
| Rec IP Address | | Receiver's IP address |
| Recv IP Port | 5551 | Net Condition test port ID |
| | 5552 | Data Transfer test port ID |
| Recv Embed Offset Sec | | Padding |
| Force Payload Size | 28 | Net Condition test packet sizes |
| | 10-1400 | Data Transfer test packet sizes |
| Force Packet Count | 10-100 | Data Transfer test packet breakdown |
| Inter-packet Delay ms | arbitrary | Inter-packet delay for Net Condition and Data Transfer tests are determined by TSSF. |
| Loop and Restart | Net Condition | Yes – data transfer is constantly repeated |
| | Data Transfer | No – data transfer is not repeated |

FIG. 6B

NETWORK CONDITION RECORD 40R

44A - packet number - the number of packets that were sent for the whole data
44B - payload – the size of a sent packet in bytes
44C - totalbytes - the total aggregate bytes of the combined payloads that represent the total data
44D - Interpacketdelay_ms - the time spacing of packets sent (in ms)
44E - elapsedtime_sec - the duration the listener ran
44F - packetsIN - the # of packets received IN by listener per TRANSFER
44G - packetsOUT - the # of packets sent OUT by listener per TRANSFER
44H - bytesIN - the bytes received in per transfer
44I - bytesOUT - the bytes sent out per transfer
44G - bytesIN/sec - the rate of bytes
44H - bytesOUT/sec - the rate of bytes OUT
44I - packetsIN/sec - the rate of packects IN
44J - packetsOUT/sec - the rate of packets OUT
44K - numreads - the number of attempted reads from socket
44L - numreadsblocked - the number of reads to socket having nothing to read
44M - numkrnlreaderrs - the number of read errors (e.g. MAC layer failure; helpful to show wireless network blackout conditions)
44N - numwrites - the number of attempted writes to socket
44O - numwritesblocked - the number of writes to socket unable to send out (shows that network is clogged; IP stack unable to accept more)
44P - numkernelwriteerros - the number of write errors (see note on MAC layer)
44Q - numkernelunspecifiederrors - the number of unknown errors
44R - jitter avg sec - the avg jitter
44S - jitter max sec - the max jitter
44T - jitter min sec - the min jitter
44U - packet loss - packets not received (the packet loss)
44V - % loss - percentage of loss out of total
44W - pass sequence - # of packets in sequence (by checking the incremental sequence ID on each packet. Next packet ID is current ID + 1)
44X - fail sequence - # of packets not in precise sequence
44Y - % out of sequence - percentage of packets out of sequence out of total net condition 2-way delay average - the two-way, round trip packet delay as measured in seconds, to microsecond precision. The average value across all packets received during the specific data transfer and its time frame.
44Z - net condition 2-way delay max - the max of the delay value for the network condition
44AA- net condition 2-way delay min - the min of the delay value for the network condition
44AB -net condition jitter avg sec - the average jitter for the network condition
44AC -trenduprdown - the change of the delay during the test
(+ means the delay was increasing during the test, - means it was decreasing

FIG. 6C

ADAPTIVE CONTROL OF DATA PACKET SIZE IN NETWORKS

FIELD OF THE INVENTION

The present invention is directed to a method and system for transmission of data through a network and, in particular, to a method and system for the transmission of data through a network wherein data packet size is adapted to network conditions to enhance the data transmission rate to meet predetermined requirements of data transmission.

BACKGROUND OF THE INVENTION

Networks have long been commonly used to communicate information of all forms between various computer systems, such as program code and data, including audio, graphic and video or graphic information. As a result, computer systems and communications systems have evolved together, each influencing the other and each evolving to address methods and problems presented by the other.

For example, telephone networks, long being in existence as a widely available means of communicating information from one point to another when computers were first developed, were one of the first forms of network used for communication between computer systems. The inherent characteristics of the original telephone networks thereby, as a consequence, defined the original computer communication methods and technologies. As is well known and understood, telephone networks allow communication of audio data, or more broadly audio signals, between two or more users by establishing a dedicated communication circuit or "channel" between the users through one or more central switching systems. As is also well known and understood, information in a computer system is structured as units or packets of multiple bits or bytes of predetermined size and, as a consequence, various methods and signal formats were developed to communicate digital information packets through the telephone networks.

The essential nature of the original telephone networks is such that a channel, once established, is dedicated exclusively to a single information exchange, whether the information is a conversation between user's or digital information being communicated between one computer and another. Dedicated channels are advantageous in that the entire bandwidth of the channel is available for a given information exchange and in that any transmission delays from an information source to an information recipient are purely a function of the direct transmission speed through the channel. Since dedicated channel transmission speed does not significantly vary over time or with the information transmission load, dedicated channels are capable of providing "isochronous" transmission. A significant disadvantage of dedicated channels, however, is that dedicated channels preempt significant bandwidth of the communications network. That is, the complete bandwidth of a channel is and remains available and dedicated to a given link between computer systems, even when the information exchange does not require the full bandwidth of the channel and even when no information is being transmitted.

For the above reasons, dedicated channels have been inadequate to meet the needs of intercomputer communication as information exchange between computer systems has become more common and widespread. As a consequence, telephone systems and computer communication methods have evolved to meet to the increased demand for information exchange between computers, and have generally evolved in conjunction to meet common needs, in particular the transmission of data, and to make advantageous use of jointly developing technologies.

For example, various forms of networks have been developed that are dedicated to or specifically adapted to communication between computers. Networks specifically oriented to intercomputer communications typically provide individual computers shared access to a common communication backbone having relatively broad bandwidth, such as fiber optic cables or coaxial or twisted pair cable. The individual networked computers, commonly referred to as "nodes", are typically granted access to the complete bandwidth of the backbone for the transmission of each information packet for a period, and when a transmitting computer completes transmission of a packet the backbone is made immediately available for the other computers or nodes connected to the network. Each computer thereby has access to the full bandwidth of the network, but only during the actual transmission of a packet, so that many computers may efficiently share the common "backbone". A typical example of such a computer network is a personal computer ("PC") network as PCs are used for a wide range of applications requiring the PCs to communicate with each other over a computer network. Typical computer networks connecting PCs, as well as other computers, nodes and related devices and systems, include local area networks ("LANs") interconnecting PCs located in relatively close proximity and wide area networks ("WANs"), which are typically comprised of a network of separate LANS and provide communications over wider areas. The "Web", for example, is a very extensive WAN interconnecting LANs as well as PCs, larger computers, nodes and related devices.

Telephone networks in various forms, however, remain the most common method for interconnection and communication between computers. For example, telephone networks are frequently employed as a WANs linking individual computers or LANs and the World Wide Web is primarily based upon telephone networks. Many telephone systems are presently implemented with broadband channels, such as fiber optic lines, to provide increased numbers of channels or increased channel bandwidths for the transmission of computer data and digitized voice signals. As a consequence, there have been extensive efforts to establish interface standards, methods and technologies for the faster and more efficient transmission of digital information packets through the various implementations of telephone networks. For example, many telephone systems are now implemented using computer network technologies, such as broadband backbones, and many telephone networks also digitize audio information, that is, voice signals, into digital data packets analogous to computer data packets. The adaptation of computer network technologies to telephone networks thereby allows voice information to be communicated in a manner analogous to computer information packets by concurrent communication of multiple channels on a single line and the routing of digitized voice packets through multiple paths. The adaptation of computer originated technology and methods to telephone systems and voice communications thereby allow telephone networks to carry both voice information and computer information with equal facility. The consequences of such developments in telephone systems may be seen, for example, in the implementation and rapid expansion of Work Wide Web communications between computers, which is primarily implemented through the telephone networks.

The development of the hardware technologies of telephone networks and of computer specific networks has been paralleled by the development of standards and protocols for the more efficient transmission of data packets through computer networks. In this regard, the heart of any computer network, whether based upon a telephone network or implemented as a network dedicated to or specifically adapted to communication between computers, is a communication protocol wherein a communications protocol is a set of conventions or rules that govern the transfer of data between computer devices. The simplest protocols define only a hardware configuration, while more complex protocols define timing, data formats, error detection and correction techniques and software structures. Virtually all forms of computer networks commonly employ multiple layers of protocols wherein each layer of the protocols defines and controls a corresponding level of operations in the communication between computers through the network. For example, the physical protocol layer typically define and control the lowest level of operations and will commonly include a low-level physical or device layer protocol that assures the transmission and reception of a data stream between two devices, while a higher level data link protocol layer defines and manages the construction and transmission of data packets. Network and transport layer protocols, such as the Transmission Control Protocol/Internet Protocol ("TCP/IP"), operate a higher levels than the physical layer protocols, and in turn govern the transmission of data through the network itself, thereby ensuring the reliable end-to end delivery of the data packets defined at the lower levels.

There are presently a range of industry standard protocols for the efficient transmission of data through both computer specific networks and telephone networks, most of which are based upon the packet transmission of data. Examples of existing standards and protocols for the transmission of computer data through networks, including telephone networks and computer specific networks, include the Integrated Services Digital Network ("ISDN"), which standardizes connection interfaces, transmission protocols and services to create a unified digital circuit-switching network. A further example is Broadband ISDN ("BISDN") which, unlike ISDN which is a digital network standard, uses packet relay, or Asynchronous Transfer Mode ("ATM"), as a transmission standard, particularly for transmission over broadband "backbones". ATM is primarily a connection-oriented technique that can transport both connection and connectionless-oriented services at either a constant bit rate or a variable bit rate. ATM provides bandwidth on demand and handles all traffic types through fast-packet switching techniques that reduce the processing of protocols and uses statistical multiplexing to control transmission through the network.

It has long been commonly recognized and understood, however, that a primary limitation upon the communication of data through networks is that the bandwidth resources available in any network are limited. Other, related problems include network latency and jitter, which are delays in end-to-end data transmissions arising from a variety of causes. The "latency" of a network includes the inherent delay times through the elements of the network, such as through the cables or lines, the switching routers and the communications processes or protocols being executed at each end of the connection. Although the latency of a network tends to be relatively constant for a given connection, latency may vary from connection to connection, depending upon the particular route taken through a network by a given connection and upon the traffic load of the network or in the route defined for the connection. The latency of a network effects the overall efficiency and effective bandwidth or capacity of a network by imposing a practical limit on the rate at which data, and in particular packet data, can be communicated through the network, particularly since many protocols require an acknowledgment of each packet before a next packet is transmitted. "Jitter", in turn, may be defined as change in network latency as a function of time. Jitter is typically unpredictable and may arise from a number of causes, but most frequently results from variations in the traffic load along the route taken by a connection through a network. As such, the "jitter" of a network connection may vary significantly from packet to packet and even more so in systems that allow independent routing of individual packets. Jitter also effects the overall efficiency and effective bandwidth or capacity of a network by imposing a practical limit on the rate at which data can be communicated through the network, and has particularly adverse effects in asynchronous networks, such as many computer networks and networks employing, for example, the ATM protocol.

It has long been understood that efficient bandwidth and traffic management is essential to obtain full advantage of the bandwidth and capacity of a network and significant efforts have been made in designing traffic flow and congestion control processes, bandwidth management mechanisms and routing algorithms to manage available network bandwidth and capacity. The goal of such developments has been a network that is able to transmit a useful level of traffic that is directly proportional to the traffic offered to the network up to the maximum transmission capacity of the network, and thereafter to continue to operate at the maximum network capacity regardless of the imposed traffic load. The actual performance achieved in networks falls far short of these goals, however, for reasons pertaining to practical constraints in implementing networks and arising from limitations inherent in the methods presently used to manage networks.

For example, the simplest method for obtaining satisfactory performance in a network is to oversize the equipment, that is, the number and capacity of the channels and the traffic capacity of the routing switches, so that in all anticipated operating conditions the network will be operating in a zone that is well distant from congested levels or zones of operation. This method, however, is generally unsatisfactory because of cost and because the traffic demands on networks historically increases rapidly over time to exceed the anticipated maximum loads on the networks, thus resulting in eventual congestion regardless of the initial capacity of a network.

The preferred methods for obtaining satisfactory performance in networks have thereby focused on traffic management methods for managing and controlling the traffic load and flow in a network, mechanisms for allocating network bandwidth and improvements in protocols for the efficient transmission of data. Traffic flow and control measures, for example, typically include flow control for regulating the packet transmission rate of a transmitting system to a rate compatible with the rate the receiving system can absorb. Load regulation mechanisms, in turn, globally limit the number of packets present at any time in the network to thereby avoid overloading the capacity of the channels and routing switches while load balancing mechanisms distribute traffic over the links of the network to avoid local congestion.

A traffic management system, bandwidth allocation mechanism or communications protocol, however, must be structured to meet requirements arising from the characteristics of network traffic which are difficult to accommodate. For example, network traffic is typically not well behaved, that is, the traffic load may vary widely and at unpredictable times or under unpredictable circumstances, and often departs substantially from the initially assumed traffic parameters. If such a departure persists, the traffic management system must, for example, assign one or more new connection bandwidths to one or more connections to accommodate the new traffic parameters, which in turn may affect yet other connections and require adaptations or modifications of those connections, and so on. Determining the appropriate responses of the traffic management system to radical changes in traffic behavior in turn presents yet further problems. Typical problems are those of obtaining and filtering traffic load measurements to separate transient changes of traffic behavior from longer term changes and determining ranges within which the initially assumed traffic parameters can be maintained and outside of which new connection bandwidths must be requested. For example, a bandwidth that is too large for the actual traffic is wasteful of connection resources while a bandwidth that is too small results in excessive packet loss. Continuous adjustments of channel bandwidths to meet transient conditions, however, absorb excessive network resources in continuous adaptation to conditions that may have changed by the time the adaptations take effect.

Another source of network problems arises when the communications protocols implemented in a given network for efficient data transmission conflict with the operation of the network traffic management system. This problem arises, for example, from conflicting goals when the traffic manager operates to optimize the overall performance of the network while the protocols executed in the network users attempt to optimize the performance of each user of the network individually. For example, it has been described above that TCP/IP is a very commonly used protocol. TCP/IP, however, employs a "go back N method" for dealing with errors and flow control problems over a network. If there is a transmission error, a packet loss, excessive latency in the delivery of a packet, delivery of a packet out of sequence or an overflow of a receiver buffer, the protocol retransmits N preceding packets. The retransmission of packets by TCP/IP in response to problems that may arise from traffic congestion may thereby significantly increase the traffic load congestion that the network management system is attempting to address. This problem may become particularly severe if the TCP/IP protocols of several users are retransmitting packets in response to data communications problems arising from traffic congestion rather than from circumstances in the individual transmitters or recipients.

To illustrate the above by considering various mechanisms of the protocols and network management mechanisms of the prior art in greater detail, many protocols such as TCP/IP implement packet priority mechanisms to prevent saturation of a network. A "leaky bucket" algorithm, for example, limits the number of low priority packets that can be transmitted in a fixed period of time when the packets digress from an original rate of transmission, so that high priority traffic is thereby transmitted with little or no delay. A leaky bucket or similar packet priority mechanism will thereby maintain packet transmission at acceptable levels if the traffic is not unreasonable and if the traffic remains within a reasonable range of the initial transmission parameters. Network traffic loads, however, are often unreasonable and often depart substantially from the initial transmission parameters, thereby requiring other mechanisms to accommodate changes in the traffic loads.

For example, if a departure from the initial traffic parameters in a given connection persists for a significant length of time, a traffic control system will typically assign a new connection bandwidth to the connection to accommodate the new traffic parameters. This mechanism, however, must adapt both to radical changes in traffic behavior and the problem of short-lived changes in traffic behavior as opposed to long term changes and must determine which connection bandwidths would be suitable to traffic behavior at a given time. Too large a bandwidth would waste connection resources and a too small a bandwidth would result in packet loss.

The problem of determining appropriate connection bandwidths may be illustrated by consideration of the problems of latency, jitter and "burst" type data. That is, and for example, if packets are being transmitted through a connection with no losses and the predefined maximum window size is appropriate, wherein window size may be considered as connection bandwidth and the time interval assigned for transmission to a given system, the steady flow of transmission data will bring the TCP protocol to a steady state. In this steady state, one new packet of data is placed on the network for transmission each time an acknowledgment of receipt of the previous packet is received from the receiving end node of the connection by the sending end node of the connection. The time lapse between each packet transmission is thereby determined by the rate at which acknowledgments arrive at the sending end node. If network bandwidth and latency remain consistent, packets flow freely and few packets are lost to buffer overflows, such as in routers. However, and as discussed above, many networks are subject to long term changes in connection bandwidth, as when bandwidth is reassigned due to changing traffic conditions, and long and short term variations in latency, including jitter due, for example, to short term traffic conditions. Variations in bandwidth requirements may also arise from the nature of the data being transmitted. For example, video and voice data typically appears as data "clusters" interspersed with large gaps. As a consequence, the voice or video data clusters are typically transmitted in "bursts" and as a result a protocol such as TCP/IP does not make efficient use of the bandwidth available between bursts.

A traffic control system typically adapts to changes in traffic parameters by defining the regions of the network where bandwidth allocations do and do not require adjustment to meet traffic needs. Bandwidth allocations are adjusted upward if measurements indicate the anticipated maximum acceptable packet loss will be exceeded or that traffic on the connection will interfere with other connections sharing the transmission medium. Bandwidth requirement is adjusted downward if the quality of service will be acceptable for all users.

To determine the required bandwidth adaptations, a traffic control system will take measurements of the mean burst duration and mean bit rates and will filter the measurements to insure that a statistically reliable number of raw measurements have been obtained. The minimum required number of raw measurements and the mean bit rate of the traffic will determine the time required to collect the raw measurements. This measurement time, in turn, may used to analyze statistics of the incoming data stream to, for example, a leaky bucket mechanism and to determine the effect of the leaky bucket on incoming traffic. This effect may then be used to predict how the leaky bucket is monitoring the transmission, and to determine packet loss probability.

When traffic parameters fall outside of the acceptable bandwidth adaptation range, a traffic control system will request a new connection with a different bandwidth. Typically, however, the adaptation mechanism requires a longer time to adapt to upward changes in the traffic parameters, that is, to increases in traffic load or speed, due to the time lag in the measurement and filtration process. This, in turn, often results in overcompensation in upward or downward network bandwidth adjustments and either inefficient use of network resources or degradation of data transmission or both. This problem further compounded in that it is common to have a single processor monitoring and performing traffic control functions for several connections, so that the bandwidth adaptation functions are limited by inadequate processing capabilities.

Many protocols and network management systems also perform "windowing" of network resources, that is, the allocation of transmission periods and bandwidths to systems for communication through the network and the adjustment of the windows as traffic needs change. The performance of a TCP/IP monitored transmission, for example, depends heavily on the value is determined for the threshold for window growth, that is, the speed with which a window may be increased, and the maximum window size. If a window size is too small or the threshold is too low, the TCP/IP will not be able to transfer sufficient data for optimum performance and, if the prescribed window size is too large, TCP/IP may lose packets or network congestion may ensue, or both.

For example, under some conditions a current window size may grow to a maximum window size that may exceed the window size optimal for the link and such an oversize window may allow TCP/IP to transmit excessive numbers of packets. The superfluous packets may exceed the optimal number of packets for the available bandwidth and buffer space available at nodes between the sending and receiving end nodes of the connection, thereby overloading the system.

Yet other problems occurs in the handling of packet dropping under the TCP/IP protocol when excessive packets are transmitted. For example, if the slowest intermediate node between a sending end node and a receiving node of a network connection has insufficient buffer space to hold the surplus packets, the packets will be dropped. The dropping of packets will result in TCP/IP initiating a time-out and the retransmission of packets. Depending on the version of TCP/IP, the protocol will either reduce the window size by half or restart with the original window size for each dropped packet. Under these conditions, this response by TCP/IP will initiate a repeated cycle wherein TCP/IP will increase the window size, surplus packets will be transmitted, a packet will be dripped due to insufficient buffer capacity, and the window size will be reduced, and so on, which will result in a severe reduction in packet throughput.

In the circumstance wherein the slowest intermediate node does have enough buffer space to hold extra packets, packets will not be dropped initially. However, subsequent packets will be continuously transmitted by other nodes on the network and the rate of transfer of packets will become progressively slower through the nearly saturated buffer. At some point the network will become congested and the buffer will eventually no longer be able to store additional packets. Packets will then be dropped, and the above described cycle will begin.

Yet further problems of the methods of the prior art arise in that the performance of protocols using windowing, such as TCP/IP, depend significantly upon altering window size. In TCP/IP, for example, the window size is set at one when there is no data being sent across the network and when packets begin to flow on the network TCP/IP starts increasing the window size towards the predefined maximum. If the current window size is near or at maximum when new data is transmitted, the packets will be placed on the network in rapid succession until all the packets are sent, whereupon the window size will be reset to one as there are no further packets to be transmitted. This process, however, may result in a number of undesired consequences. For example, the rapid transmission of packets when the window size is near or at maximum comprises a "burst" of packets, as described above, that may be a cause for network congestion. As a further consequence, due to the network congestion resulting from such a burst of packets, the packets transmitted at the end of the burst may be dropped because of network congestion and/or buffer overflow. In addition, and when data is transmitted intermittently, as in successive, separated blocks, the window size may be reset to one at the end of each block of transmitted data. The window size will thereby start at one for each new block of data, so that TCP/IP is prevented from fully utilizing the available bandwidth Problems may also arise from the operation of routers, which transfer information from network to network and perform conversion operations at the physical and network layer of protocols in doing so. In particular, the physical Layer 28 typically includes a media access layer (MAC) that specifies the maximum transmission unit (MTU) that can be transmitted over the physical medium wherein the MTU is defined and described as a maximum number of transmission units a network segment is capable of transmitting. An MTU is thereby essentially the maximum size of data block or data unit, sometimes referred to as a segment, that can be conveyed through the physical medium of the network and will depend upon the physical characteristics of the network, the router and the protocol. Because of MTU limitations, therefore, a router is often required to convert a packet into small units, generally referred to as "fragments", in order to transfer the packet through a network.

In particular, MTU complications may arise during the transmission of a packet, often referred to as a datagram, through a connectionless network. In a connectionless network, no connection information is assigned to a packet as it travels between the nodes of the network and the packet instead contains only information identifying the end node destination of the packet. As such, and as an intended consequence, each packet will typically and often travel over a different path of one or more networks or routes through one or more networks to arrive at the destination node. As the datagram travels from the sending node to the destination node, it is typically fragmented by various amounts to conform to the MTU of each intermediary network. Routers in connectionless networks, such as the Internet, thereby require increased processing power to fragment large segments into smaller segments, thereby increasing transmission overhead and processing time during the transmission of a datagram. In addition, the destination host is required to expend an increased amount of processing resources and time to buffer a potentially large cache of segments and to reassemble the segments into the original message. These requirements increase the latency of the network, and jitter due to the different transmission times of the fragments, while the increased the amount of packet header information that must be transmitted because of fragmentation effectively reduces the effective network bandwidth.

If a datagram travels over a route with an inherently large MTU, it may not be necessary to fragment the packet. However, when fragmenting is required, it may be difficult to control on a connectionless network because each segment may travel over a different route. Also, if a route of a network fails or is incorrectly configured, the network properties may change so that segments may be sent over a route with a smaller MTU, thereby requiring more extensive fragmentation. As a consequence, the routing of the segments or fragments of a datagram may become extremely complex, and it is difficult for a transmitting host to select an appropriate datagram size that will minimize fragmentation. As a result, current techniques for selecting datagram sizes to reduce overall fragmentation while maintaining an optimum bandwidth have not been successful.

In yet other methods of the prior art for network management, the transport Layers 28 of certain protocols may use a "packet metering" protocol instead of a window sizing protocol. As described, window sizing allows one new packet of data to be placed on the network for transmission each time an acknowledgment of the receipt of a preceding packet is received by the sending end node. In contrast, packet metering limits the rate at which packets are placed on the network by instructing the sending end node to send the packets at a selected rate if the network is not congested. In packet metering systems the packet metering rate is set during the initial system configuration and remains fixed thereafter while in other systems the metering rate is adapted to changing network conditions.

Window sizing and packet metering have relative advantages and disadvantages. For example, when the packet-metering rate is set appropriately, packet metering avoids the bursts resulting in window sizing systems from intermittent data transmission. Also, optimal packet metering results in the transmission of data at a rate that does not cause congestion or packet dropping while making optimum use of the available bandwidth.

In comparison, window sizing avoids congestion but uses bandwidth inefficiently by reducing the window size after each block of data that is transmitted. An advantage of window sizing as opposed to packet metering, however, is that window sizing tends to provide better limits on the number of additional packets that are transmitted after packets are dropped by halting transmission of packets immediately if an expected acknowledgment is not received. In contrast, packet metering depends on packet rate measurements that are taken after two or more packets are sent, so that the mechanism responds more slowly to missing acknowledgments. In one packet metering system, for example, the rate at which packets arrive at the receiving end node and the rate at which they are removed from the receiving end node's buffer for processing is transmitted to the sending end node and extra packets will continue to be placed on the network during the measurement and rate information transmission interval.

A recurring and severe problem with window sizing, packet metering and similar systems and protocols, however, is that such systems and methods require accurate information regarding network parameters and careful choice of adaptive parameters to be effective. Many such mechanisms, for example, are statically configured with parameters such as a maximum window size, a start widow growth threshold, ranges for separating rapid window growth from slower window growth, or default packet-metering rates. Networks, however, and in particular networks of any extent and especially connectionless networks such as the Internet are so complex that it is extremely difficult to determine the optimum operating parameters for such mechanisms. The problem is further compounded by variations and changes in network parameters, such as traffic load and the changing conditions through various links or connections of a network.

The above discussed problems of the method and mechanisms of the prior art for the management and operation of networks are further compounded by more recent developments in network technologies and developing applications for networks, such as the transmission of video data.

For example, Internet applications across wireless networks are rapidly becoming common and are carrying rapidly increasing volumes of data traffic of all forms, so that the reliable performance of data communications in mobile environments is becoming a vital issue. The methods and mechanisms of the prior art for managing network data communications, however, are essentially based upon prior wired network models and are often inadequate for new network technologies, such as mobile, wireless networks and may often actual degrade the operation of such networks.

To illustrate, delays and packet losses in a wireless environment are often caused by problems that are not related to network congestion, such as communication pauses during handoffs between wireless cells, packet losses of a mobile node moves out of range of the base stations, and packet losses due to transmission errors on wireless links. A protocol such as TCP/IP, however, may interpret such delays and packet losses as an indication of network congestion. As described above, TCP/IP will respond to packet losses by assuming network congestion, retransmitting the apparent lost packets and initiating congestion control procedures. Such procedures include or may include reduction of the transmission window size, restriction of the window growth rate, and resetting a retransmission timer to a back-off interval that doubles with each consecutive timeout. As a consequence, and even though wireless networks typically contain mechanisms to indicate network changes such as handoffs between cells, such mechanisms often may not respond in time to prevent the initiation of TCP/IP network congestion procedures. TCP/IP will thereby frequently respond inappropriately to a short term wireless network problem that is particular to mobile, wireless networks, thereby degrading the network performance.

It must be noted that wireless networks are subject to still further problems than those resulting from node motion, such as packet losses due to physical transmission errors, incorrect positioning of antennas, ambient noise, multipath interference and other factors. Again, however, and because the network management mechanisms and protocols of the prior art are essentially designed for wired networks, presently existing mechanisms and protocols will frequently respond inappropriately to problems that are particular to wireless networks or other new network technologies.

In addition, the above discussed problems have inhibited and delayed the use of networks for the communication of certain types of data, commonly referred to as multimedia data, and in particular the communication of multimedia data through a telephone type network between computers or from computers to other types of recipients and. Multimedia data is commonly understood and defined as including all forms of data, including packeted data, representing digitized audio and video signals, such as music, voice and animated graphics, that is, "movies". The goal of much current development effort in these areas is, for example, to allow the use of a computer network to carry telephone type voice communications as well as traditional computer data and to eventually allow the transmission and distribution of, for example, music, "videos" and "movies".

In this regard, it should be noted that computer data is traditionally regarded as "bursty", that is, as existing in the form of defined blocks or units and thereby appropriate for transmission through a network in the form of data "packets". This traditional view or conception of computer data arises, of course, from the inherent structure of digital data in a digital computer into units of one or more bits, bytes and words. The structure of data in a computer, however, arises from the internal physical structure of the data handling components of a computer, that is, the registers, buffers, busses and so on of a digital computer, are physically designed to store data as discrete bits. It should be noted, however, that data may be and often is transmitted through a network as an effectively continuous stream of bits, once a connection is established, as well as in packets.

In contrast, multimedia data, that is, audio and video data, is often regarded or conceived as being inherently "continuous" rather than "bursty". This view of multimedia data, however, is not entirely correct and to some extent masks the actual problems of communicating multimedia data through networks. For example, the spoken words of voice communications appear to be comprised of discrete units or utterances, that is, syllables or words, while music appears to be comprised of discrete clusters or sequences of notes. The Upon closer consideration, however, it will be realized that audio data, whether voice or music, is a continuous sequence of units of extremely variable size and duration but is effectively a continuous flow of information. The primary distinction between audio data and traditional computer data, therefore, is that traditional computer data is and may be organized and transmitted as discontinuous packets while audio data, whether voice of music, is a continuous data stream. It must be noted, however, that all forms of audio data can be and often are digitized into traditional computer digital data forms, that is, bytes and words, and stored and delivered to a user in the forms of computer data, with perhaps the additional step of a digital to analog conversion. In a like manner, video data of all forms is commonly digitized, stored and delivered to an output device as digital data and, in many instances, is generated and inherently exists in "packeted" form, such as the lines and frames of television signals and the outputs of video drivers in computers. As such, it will be readily apparent that that while audio/video information is inherently continuous in form, audio/video data can be and is readily represented in traditional digital form, that is, as "packets" of digital data, and thus would reasonably thought to be suitable for transmission through networks in the same manner as digital computer data.

A significant distinction between audio/video multimedia data and traditional forms of computer data, and a primary cause of current problems in communicating multimedia data through networks such as telephone network, however, is the sensitivity of multimedia data to "jitter", which has been defined above as time dependent changes in network latency. That is, traditional forms of computer data that are commonly communicated through networks, including telephone based networks, are commonly either used only after the entire body of data has been received or are otherwise used in a manner wherein the network latency and jitter either are not apparent or are not a problem to the user. As such, the primary considerations in communicating traditional forms of computer data through a network are reliability of transmission and speed of transmission and the traditional forms of computer data are relative indifferent to jitter.

In contrast, the human eye and ear are extremely sensitive to minute shifts or variations in tones and inflections and pauses in audio data, whether, for example, voice of music, and to pauses or variations in rate in the presentation of video data. As a consequence, audio/video multimedia data, and in particular the real time transmission and presentation of audio/video multimedia data, is extremely sensitive to jitter and may be very adversely effected by network latency. As such, the networks and protocols used to communicate multimedia audio and video data must, for example, compensate for or otherwise eliminate the problems resulting from the latencies present in a communication network, including those relating to coding, packet assembly, media access, packet propagation, receiver buffering and decoding, and jitter in any or all of these operations.

In recent years, there have been a number of attempts to produce a digital data network, including telephone networks, capable of communicating multimedia data representing digitized audio and video signals and thereby functioning not only as a computer data network but as a multimedia network and as a telephone network. As discussed above, however, multimedia audio and video signals are extremely time and jitter sensitive and, while present networks and transport protocols are generally adequate for the transmission of traditional forms of computer data, such networks and protocols have proven inadequate for the satisfactory communication of multimedia audio and video data.

In summary, therefore, the methods and mechanisms of the prior art for managing networks and the communication of data through networks contain a number of problems. For example, the methods and mechanisms of the prior art attempt to determine and control traffic conditions within a network or connection by observation of factors that are external to the network or connection and that may be only indirectly related to network conditions, or not related to network conditions at all. For example, observations regarding packet dropping rate or packet retransmission rate at a sending node are only indirectly related to such factors as bandwidth limitations or buffer congestion and may not be at all related to bandwidth limitations or buffer congestionl. The problems inherent in the processes of the prior art are further compounded in that the processes for determining conditions within a network or connection are typically based upon assumptions about conditions within a network or condition that are often invalid. For example, packet dropping rate or packet retransmission rate are assumed to reflect network conditions, such as bandwidth limitations or buffer congestion due to a too high packet transmission rate, but may in fact arise from interference by other traffic or data processing errors or limitations at the receiving node. As a result, the factors observed to determine conditions within a network or connection, the assumptions drawn from these factors and the resulting adaptive processes often have no relationship to actual conditions and problems in a network or connection and often may, in fact, degrade the transmission of data.

Yet other problems of the prior art is that the methods and mechanisms implemented to manage traffic and data transmission in a network or connection may, in fact, conflict with one another or with the basic nature of the data being transmitted or the nature of the connection. For example, the adaptations made by a protocol of one sending end node may compete with and conflict with those made by the protocols of other sending end node. In further example, many of the standard protocols and mechanisms are ill adapted to certain types of data, such as "bursty" data, and the responses of the protocols and mechanisms of the prior art to such data may, in fact, degrade the transmission of such data. In other instances, and for the same reasons, the methods and mechanisms of the prior art often conflict with or do not readily adapt to the inherent characteristics of new network technologies, such as wireless connections, and often degrade or conflict with the transmission of data across such non-traditional types of connections. In yet other instances, the protocols and mechanisms of the prior art do not address the needs of new applications for the transmission of data. For example, the methods and mechanisms of the prior art often operate to maximize data transmission rate or to minimize packet dropping or packet retransmission and may fail to address the jitter problems are significant in audio/video transmission.

The present invention addresses and provides a solution for these and other related problems of the prior art.

SUMMARY OF THE INVENTION

The present invention is directed to an adaptive packet mechanism and method for use in a data communication network including at least one sending node for transmitting packet data and one receiving node for receiving packet data for optimizing data packet transmission through a connection between the sending node and the receiving node.

According to the present invention, the current network conditions in the connection between the sending node and the receiving node are periodically determined wherein the network conditions pertain to the latency and jitter of packet transmission between the sending node and receiving node. The measurements of the latency and jitter of the connection are then used to determine an optimum packet size and an optimum inter-packet interval for transmission of packet data between the sending node and the receiving node. The amount and type of data to be transmitted from the sending node to the receiving node are also considered in determining the optimum packet size and the optimum inter-packet interval. The method and mechanism of the present invention may be employed for the transmission of data packets from the sending node to the receiving node with packet sizes and at inter-packet intervals determined according to the network conditions.

In a first aspect and implementation of the invention, the adaptive packet mechanism transmits a sequence of monitor packets from the sending node to the receiving node wherein each monitor packet includes a departure time representing a time the monitor packet was transmitted from the sending node, a packet size representing a size of the monitor packet and a packet number representing a numerical position of the monitor packet in the sequence of monitor packets. The receiving node reflects the monitor packets from the receiving node to the sending node in the sequence in which the monitor packets are received at the sending node, and the sending node, upon receiving the reflected monitor packets from the receiving node, determines network conditions in the connection between the sending node and the receiving node wherein the network conditions pertain to the latency and jitter of packet transmission between the sending node and receiving node for monitor packets of a known size and known inter-packet transmission interval.

In one implementation of the present invention the network conditions determined through the monitor packets include a maximum two way delay time for the transmission and reflection of a monitor packet, a minimum two way delay time for the transmission and reflection of a monitor packet, an average two way delay time for the monitor packets, an average jitter of the monitor packets, and a number of packets out of sequence. In further implementations of the present invention, the network conditions determined through the monitor packets further include a number of packets lost. In still further implementations of the present invention, the network conditions determined through the monitor packets further include an average available bandwidth, an average jitter, a maximum jitter and a minimum jitter.

According to a first aspect of the present invention, the network conditions are determined by transmitting a sequence of monitor packets from the sending node to the receiving node, each monitor packet including a departure time representing a time the monitor packet was transmitted from the sending node, a packet size representing a size of the monitor packet and a packet number representing a numerical position of the monitor packet in the sequence of monitor packets. In the receiving node, the monitor packets are reflected back from the receiving node to the sending node in the sequence in which the monitor packets are received at the sending node. The sending node, upon receiving the reflected monitor packets from the receiving node, determines network conditions in the connection between the sending node and the receiving node and, from the network conditions, determines an optimum packet size and an optimum inter-packet interval for transmitting packets from the sending node to the receiving node.

In a further aspect of the present invention, the receiving node will determine network conditions from the received monitor packets, and may store the network conditions in one or more condition records. Alternately, the receiving node may return the network conditions determined in the receiving node to the sending node, where the sending node will update the optimum packet size and inter-packet interval using the network conditions determined in the receiving node.

In a still further aspect of the present invention, packets will be transmitted from the sending node to the receiving node and the receiving node will transmit an acknowledgment for each packet received from the sending node. The sending node will utilize the acknowledgments received from the receiving node to determine network conditions in the connection wherein the network conditions pertain to the latency and jitter of packet transmission between the sending node and receiving node for monitor packets of a known size and known inter-packet transmission interval. The sending node will determine from the network conditions an optimum packet size and optimum inter-packet interval for transmission of data packets to the receiving node.

In a yet further aspect of the present invention, the sending node will transmit a sequence of data packets from the sending node to the receiving node and the receiving node will determine the network conditions from the received data packets. The receiving node will return the network conditions determined in the receiving node to the sending node, and the sending node will determine an optimum packet size and an optimum inter-packet interval for the transmission of data packets from the sending node to the receiving node from the network conditions received from the receiving node.

BRIEF DESCRIPTION OF THE DRAWINGS

The foregoing and other objects, features and advantages of the present invention will be apparent from the following description of the invention and embodiments thereof, as illustrated in the accompanying figures, wherein:

FIG. 6B is diagrammatic representation of a control script; and,

FIG. 6C is a diagrammatic representation of network condition record.

DETAILED DESCRIPTION OF THE INVENTION

A. General Principle of Operation

Figure 1A:
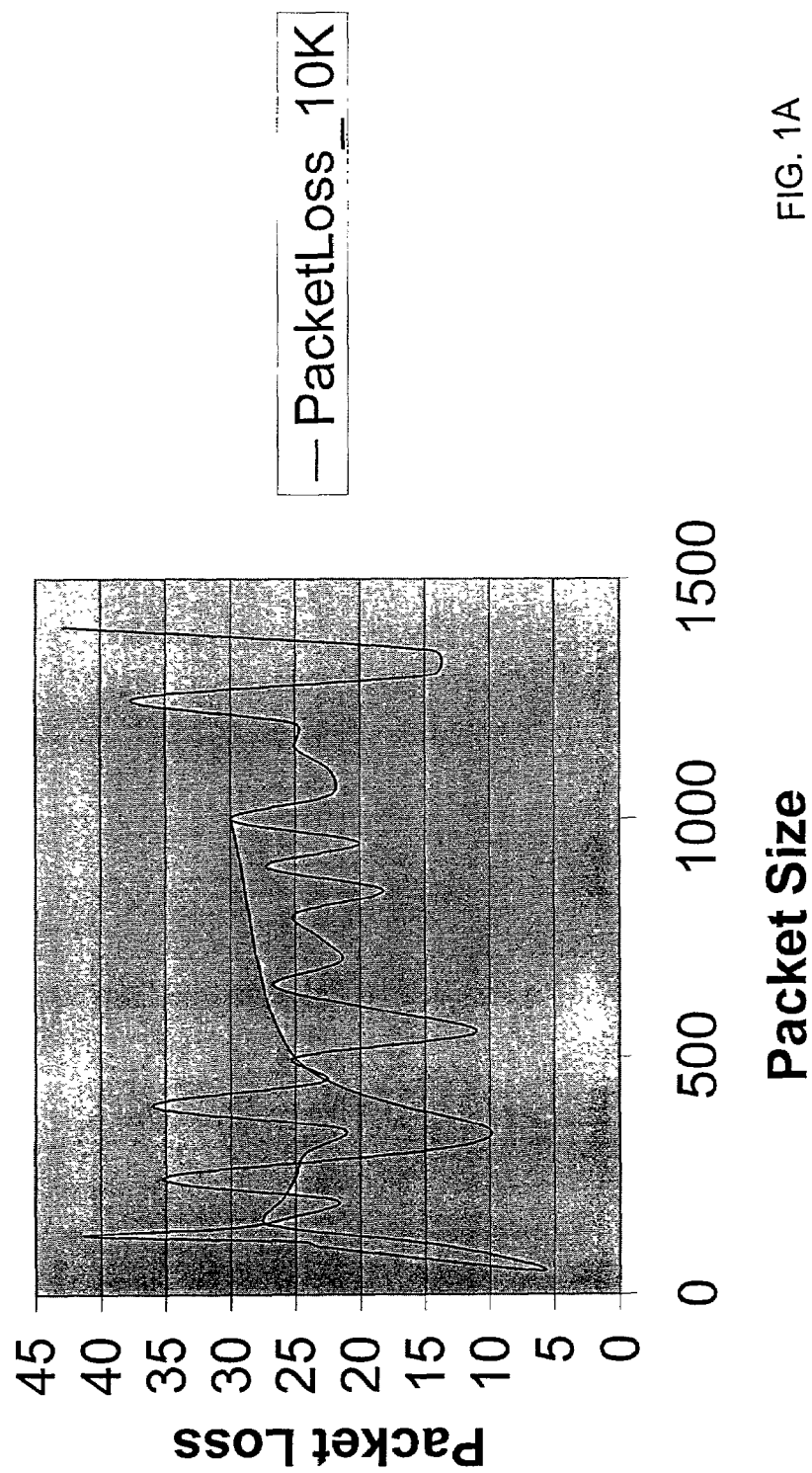
FIGS. 1A–1C are charts illustrating network conditions addressed by the present invention.

It has been described herein above that the volume of data traffic that may be communicated through a network connection between a data source and a data recipient, and the time required to communicate the data traffic through the network, is determined by the bandwidth of the connection. The bandwidth of a connection is in turn is determined and limited by the delays inherent in communicating data through the connection. The delays in communicating data through a network may, in turn, be regarded as comprised of a relatively constant component and a time variable component. The constant component, referred to as the "latency" of the network, includes, for example, the inherent delay times through the elements of the network, such as through the cables or lines, the switching routers and the communications processes or protocols being executed at each end of the connection. The latency of a network effects the overall efficiency and effective bandwidth or capacity of a network by imposing a practical limit on the maximum rate at which data can be communicated through the network, and is often determined by the element of the network connection having the lowest bandwidth. The time variable component of the delays through a network, referred to as "jitter", is typically unpredictable and may arise from a number of causes, but most frequently results from variations in the traffic load along the route taken by a connection through a network. Jitter also effects the overall efficiency and effective bandwidth or capacity of a network by imposing a practical limit on the rate at which data can be communicated through the network and often limits the effective, practical bandwidth of the network or network connection to a value far below the theoretical maximum bandwidth of the network or network connection. It should also be noted that unlike the more constant latency of a network the jitter of a network or network connection, which is typically determined by the bandwidth of the lowest bandwidth element in the connection, the jitter of a network connection is typically comprised of sum of the network jitter components along the connection, which may vary independently.

In contrast to the methods and mechanisms of the prior art, the present invention does not attempt to determine network or connection conditions upon the basis of secondary factors, such as packet error, packet loss, packet dropping, or packet retranmission rates as in methods of the prior art, although such error factors may be used to refine the results of the present invention in certain implementations. The present invention instead, determines the data transmission conditions of a network or connection solely from externally observed data. That is, the present invention does not attempt to monitor conditions or events internal to a network or connection, but instead effectively treats a network or connection as a "black box" and relies solely upon capturing and extracting information pertaining to network or connection conditions that is directly accessible at the data transmitter and data receiver.

Also in contrast from the methods of the prior art, the present invention does not attempt to control or modify internal conditions or operation of a network or connection, but adapts data transmission to the observed network or connection conditions solely by control and adaptation of externally controllable data transmission characteristics In particular, the present invention attempts to directly determine the optimum bandwidth available through a network or connection, and to determine the data transmission characteristics to optimally conform to the available bandwidth. More specifically, the present invention adapts data transmission to existing real time network or connection conditions and available bandwidth by controlling packet size and inter-packet interval. Adaptation of network communications to the available bandwidth will, in turn, address such secondary effects as packet error rate, packet loss or packet dropping.

According to the present invention, it is recognized that the latency and jitter of a network will vary in time from connection to connection and within a given connection and that the latency and jitter of a network or connection are often not linear functions with respect to such variables as time, data type or traffic load. As a consequence, the latency and jitter of a network are extremely complex or virtually impossible to predict or determine. Stated another way, it is at best difficult to monitor or control all of the internal operations and conditions necessary to manage communications in a network of significant size or complexity so as to reduce or control latency and jitter. According to the present invention, however, the latency and jitter of a given network connection and the bandwidth of a network connection is a function of the relative size of the packets and of the inter-packet interval of the transmissions, that is, the interval between packets that are transmitted consecutively through the connection, and may be determined by comparison of the relative, comparative latency and jitter of different size packets.

Figure 1B:
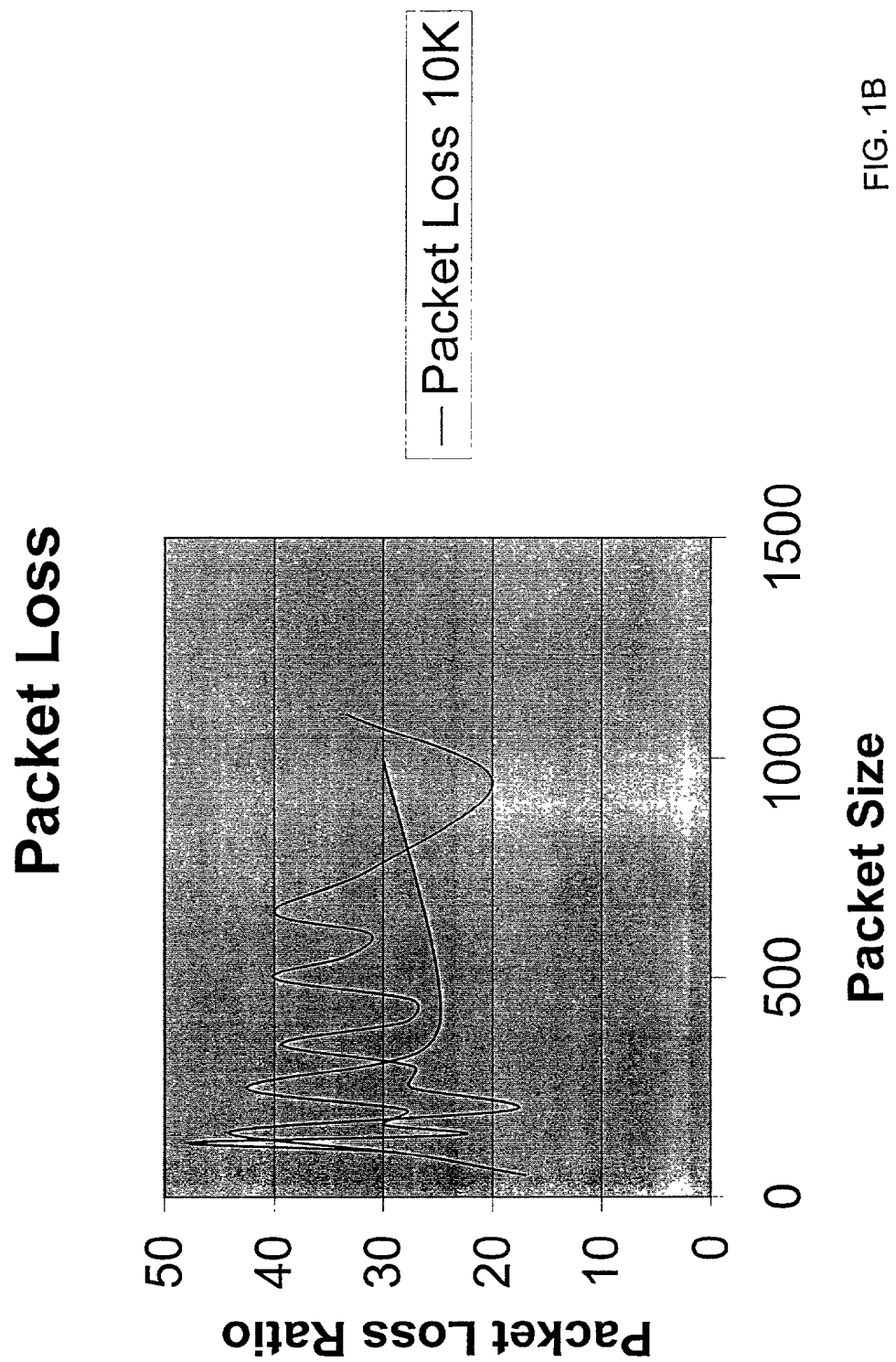
Figure 1C:
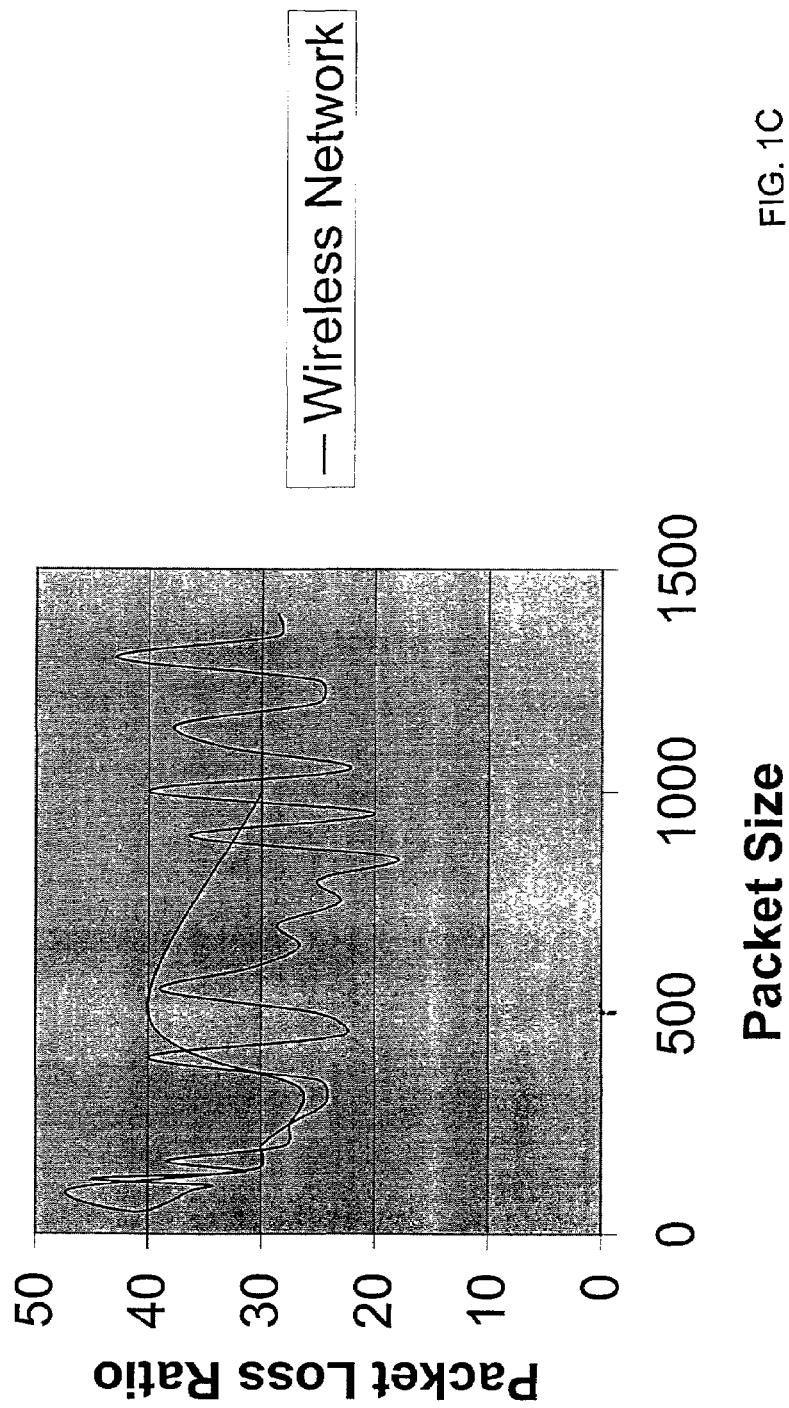

These aspects of networks and connections, which are addressed by the present invention, are illustrated in FIGS. 1A through 1C for exemplary tests of a network connection between two identical Pentium III 500 MHz Sony laptops with 128 MB memory wherein the two laptops were connected through the Internet, using identical wireless phones as modems. The connection speeds were at around 10 kilo bits per second up and 8 kilo bits per second down and all of the tests used 10 KB of total data for the transfer. Two tests, tablulated in FIGS. 1A and 1B, used an inter-packet delay of 10 msec as the inter packet delay and were separated in time by 200 msec and the third test, tablulated in FIG. 1C, used an inter-packet delay of 20 ms. A numeric tablulation of the tests and test result of the tests illustrated in FIGS. 1A through 1C are presented in chart form in Appendices A, B and C, respectively.

It may be seen from these examples that packet size significantly effects packet loss, that the packet size—packet loss relation is very unpredictable, with significant variation over even short intervals, and that the packet loss experienced by a single packet size changes dramatically within milliseconds. For example, it will be noted that the results obtained for a given packet size may vary dramatically over even very short periods, such as 200 millisecond, that these variations occur for a wide range of different packet sizes, ranging from between 50 to 1000 bytes, and that the results obtained for a given packet size may even reverse at similar network conditions. It will therefore be apparent that the packet size—packet loss relation model for data transmission through a network is very complex and very dynamic and changes dramatically over time. As a consequence, the latency and jitter of a network or connection are often not linear functions with respect to such variables as time, data type, traffic load, packet size or inter-packet interval, and the latency and jitter of a network are extremely complex or virtually impossible to predict.

As will be described in the following, the method and mechanism of the present invention determines, in real time, the packet size and inter-packet interval that utilizes the maximum available bandwidth of the connection most efficiently under current network latency, jitter and traffic conditions by comparison of the relative latency and jitter of different sized packets. The present invention then adjusts the transmitted packet size and inter-packet interval in real time to that optimum for the current network and connection bandwidth.

B. General Description of a Network Incorporating the Present Invention (FIG. 2)

Figure 2:
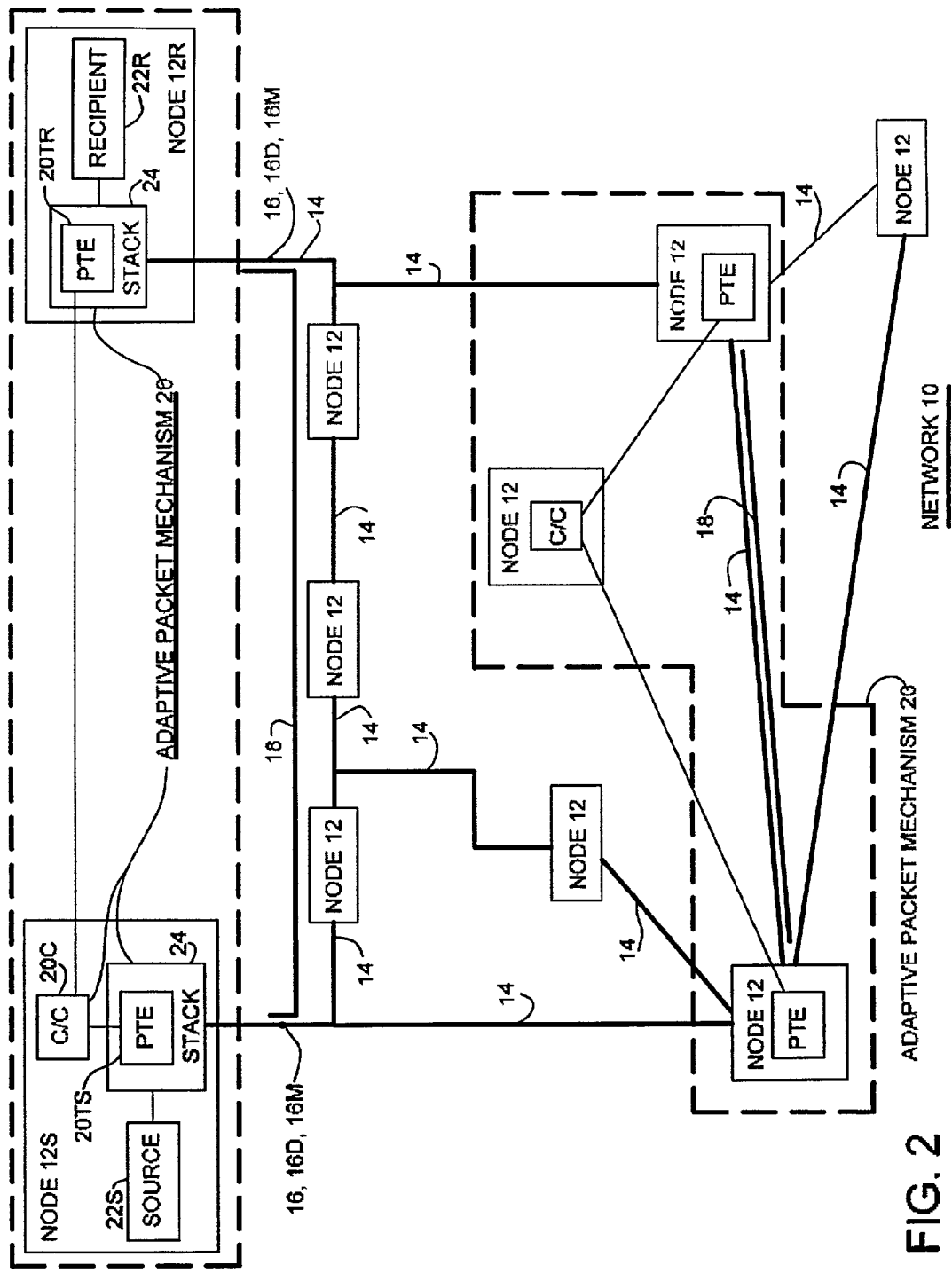
FIG. 2 is a diagrammatic representation of an exemplary network system incorporating an adaptive packet mechanism; and, FIG. 3 is a diagrammatic representation of the OSI protocol model.

Referring to FIG. 2, therein is shown a diagrammatic representation of an exemplary Network 10 in which the present invention may be implemented. Exemplary Network 10 may be, for example, a packet based system, such as the Internet and may be comprised, for example, of a diverse range of networks linked to packet switched IP (Internet Protocol) backbones. A Network 10 is comprised of a plurality of Nodes 12 interconnected by Lines 14 wherein Lines 14 may be any of a range of forms of transmission media, such as, and for example, fiber optic cables, coaxial lines, telephone lines, wireless connections and so on. A Node 12, in turn, may be comprised of a computer, network server or router, a network or, for example, a more specialized data display or presentation device such as a telephone, mobile phone or processing device, television or audio system.

Packets 16 containing data of any of a wide range of types are communicated from a Sending Node 12S to a Receiving Node 12R through a Connection 18, which is a Packet 16 transmission path between a Sending Node 12S and a Receiving Node 12R through Network 10. It will be understood by those of ordinary skill in the arts that a Connection 18 may be comprised of any combination of Lines 14 and Nodes 12 wherein the Nodes 12 in a Connection 18 may include, for example, routers, switches, networks or sub-networks or servers operating to establish a Connection 18 between a Sending Node 12S and a Receiving Node 12R. It will also be understood that a Connection 18 or a Network 10 or the path followed by Packets 16 may conform to a range of topologies, such as Frame Relay or an ATM. It will also be understood that a Connection 18 may be and typically is bi-directional, with the Sending Node 12S and the Receiving Node 12R alternating as the Sending Node 12S and Receiving Node 12R, depending upon the direction in which Packets 16 are being transmitted at any time. It will therefore be understood that the designations Sending Node 12S and Receiving Node 12R are solely for illustrative purposes in the following descriptions, and are not to be taken or understood as limiting or defining of the structure or function of a given Node 12. For example, a router in a Connection 16 may be regarded as, and for purposes of the present invention, may comprise either or both of a Sending Node 12S and Receiving Node 12R to receive Packets 16 from a Node 12 and to transmit Packets 16 onwards to another Node 12, and the present invention may be implemented within a Node 12 that is a router, switch or other element of a Connection 16.

It will also be understood by those of ordinary skill in the relevant arts that in, for example, a connectionless Network 10, each Packet 16 may travel over a different path of one or more networks or routes through one or more networks to arrive at the Receiving Node 12R. In such networks, and for purposes of the present invention, it will be understood that a Connection 16 may not and typically will not be comprised of a single path of Lines 14 and Nodes 12, such as routers and switches, but will be comprised of a time varying set of paths of Lines 14 and Nodes 12. In such instances, and for purposes of the following discussions of the present invention, such a time varying set or group of paths will be referred to as a "Connection 16" and it will be understood that the methods and mechanisms of the present invention will treat such a "connectionless Connection 16" as a Connection 16. In essence, and stated another way, the methods and mechanisms of the present invention will treat "connectionless Connections 14" as a Connection 16 having, for example, greater than average variations in latency and jitter from Packet 16 to Packet 16.

Lastly in this regard, it will be understood that a Packet 16 may contain any form of data, including, for example, audio or video information or a combination of audio and video information. In such instances, the audio information may include, for example, music, voice communications or a soundtrack and the video information may include, for example, animated graphics, a movie or a video signal. As such, the transfer or transmission of data from one Node 12 to another Node 12 may comprise the transmission of a single Packet 16 or of a sequence of Packets 16.

As illustrated in FIG. 2 and as described in further detail in subsequent descriptions, the method and mechanism of the present invention is embodied in an Adaptive Packet Mechanism 20 that operates to determine the optimum Data Packet 16 size and inter-packet interval to most efficiently utilize the maximum available bandwidth of a Connection 16 between a Sending Node 12R and a Receiving Node 12R for the current conditions of Connection 16 latency and jitter. As described, this optimum packet size and inter-packet interval will, as a consequence, yield the highest probability of packets arriving successfully at a given Receiving Node 12R. As will be described in further detail in the following, Adaptive Packet Mechanism 20 operates to determine the current maximum available bandwidth and latency and jitter conditions of a Connection 16 by determining the Connection 16 conditions, referred to hereinafter as the network conditions directly determined by the Connection 16 bandwidth and directly determining the Connection 16 bandwidth, including the Connection 16 available bandwidth and the latency and jitter through the Connection 16 for selected sizes of Packets 16.

In a presently preferred embodiment, Adaptive Packet Mechanism 20 includes or is comprised of two or more Packet Transfer Engines (PTE) 20T and one or more Collector/Controllers 20C. Briefly, and as will be described in further detail in following descriptions, a Transfer Engine 20T residing at a Sending Node 12S of a Connection 18 may operate under the direction of a Collector/Controller (C/C) 20CA to transmit sequences of one or more Monitor Packets 16M to a Transfer Engine 20T residing in the Receiving Node 12T of the Connection 18. One or both of the Packet Transfer Engines (PTE) 20T of the Connection 18 will determine the transmission characteristics of the Monitor Packets 16M through the Connection 18 and will extract or determine the current network conditions of the Connection 18, such as available bandwidth, latency and jitter. The network condition information will then be provided to a Collector/Controller (C/C) 20C, which will determine the optimum packet size and inter-packet interval for the current network conditions of the Connection 18.

In addition, the Packet Transfer Engines (PTE) 20T residing at the Sending Node 12S and at the Receiving Node 12R will operate as data communications protocol stack mechanisms, that is and for example, as a Transmission Control Protocol/Internet Protocol ("TCP/IP") mechanism, to communicate "payload" Data Packets 16C of the optimum packet size and at the optimum inter-packet interval between a Data Source 22S in the Sending Node 12S and a Data Recipient 22R in the Receiving Node 12R.

It will therefore be apparent that a Packet Transfer Engine (PTE) 20T will reside in each Node 12 of a Network 10 that is to function as a Sending Node 12S or as a Receiving Node 12R according to the present invention. Certain Nodes 12, however, may contain more than one Packet Transfer Engine (PTE) 20T. Examples of such would include, for example, Nodes 12 that are required to support more than one Connection 18, such as a router connected to more than one Network 10 or a server supporting a plurality of Connections 18 to other Nodes 12 concurrently. It will also be understood that a Network 10 may require only a single Collector/Controller (C/C) 20C as a Collector/Controller (C/C) 20C may operate with and control a plurality of Packet Transfer Engines (PTE) 20T, but may include a plurality of Collector/Controllers 20C, each of which may support a plurality of Packet Transfer Engines (PTE) 20T. Also, a Collector/Controller (C/C) 20C may reside in a Node 12 with a Packet Transfer Engine (PTE) 20T, that is, in either a Sending Node 12S or a Receiving Node 12R, or may reside in a Node 12 separate from the Nodes 12 in which the Packet Transfer Engines (PTE) 20T reside. The number and configuration of Packet Transfer Engines (PTE) 20T and Collector/Controllers 20C in a Network 10 will therefore depend, for example, upon the upon the number and configuration of Nodes 12 that are to operate as Sending Nodes 12S or Receiving Nodes 12R, or as both, the number of Connections 18 to be supported at any time, and so on.

Also, and although not shown in detail in FIG. 2, it will be recognized and understood that a Packet Transfer Engine (PTE) 20T residing in a Sending Node 12S or a Receiving Node 12R will effectively reside in and function as a layer or element of a layer of the Network Protocol Stack (Stack) 24 the Sending Node 12S or Receiving Node 12R. For example, in a presently preferred embodiment of an Adaptive Packet Mechanism 20, Packet Transfer Engines (PTE) 20T communicate Packets 16 at the UDP layer of TCP/IP and Packet Transfer Engines (PTE) 20T communicate with Collector/Controllers 20C at the TCP layer of TCP/IP. It will be recognized and understood, however, that an Adaptive Packet Mechanism 20 may execute or operate with a wide variety of protocols and at a number of different layers of such protocols for the transfer of data through Networks 16. While the type, degree and methods for interoperating with such aspects of the protocols as packet size and inter-packet interval may vary significantly between protocols, such protocols are widely known and well understood by those of ordinary skill in the relevant arts, the details of particular protocols. As such, the means and methods by which various implementations and embodiments of the Adaptive Packet Mechanism 20 of the present invention may be adapted to each protocol will not be discussed in detail herein.

It should also be noted with regard to the following discussions of an exemplary implementation of an Adaptive Packet Mechanism 20 that an Adaptive Packet Mechanism 20 will commonly be implemented by means of the program control of processors, such as personal computers or network servers, although at least certain mechanisms or functions of an Adaptive Packet Mechanism 20 may be implemented in dedicated circuitry. The possible implementations of Data Transmitters 10, Data Receivers 20 and Adaptive Packet Mechanisms 32 will be well understood by those of ordinary skill in the relevant arts, however, and as such will not be discussed in further detail herein.

C. Description of an Adaptive Packet Mechanism 20 (FIGS. 2, 3, 4 and 5)

1. General Discussion of Data Communications Protocols (FIGS. 3, 4 and 5)

It has been described herein above that virtually all networks employ multiple layered protocols to facilitate and implement data communications, wherein the layers of a protocol are often referred to as the "stack" or "stacks" of the protocol. Each layer of a protocol defines and controls a corresponding level of operations in the communications through the network, and the number of layers and functions performed by each will depend upon the needs of the network communications. For example, the physical layer of a protocol typically defines and controls the lowest level of operations and will commonly include a low-level physical or device layer that assures the transmission and reception of a data stream between network devices communicating through the Connections 14. A higher level data link layer defines and manages the construction and transmission of data packets, while still higher level network and transport layers govern the transmission of data through the network. FIGS. 3, 4 and 5 and the following discussions will briefly describe the layers of two commonly used and standard exemplary typical protocols, which have been discussed above as "Network Protocol Stacks (Stacks) 24". The two examples discussed below are the Open Systems Interconnection (OSI) Protocol Model 24O and the Transmission Control Protocol/Internet Protocol (TCP/IP) 24T, both of which are very commonly used in, for example, Internet communications.

Figure 3:
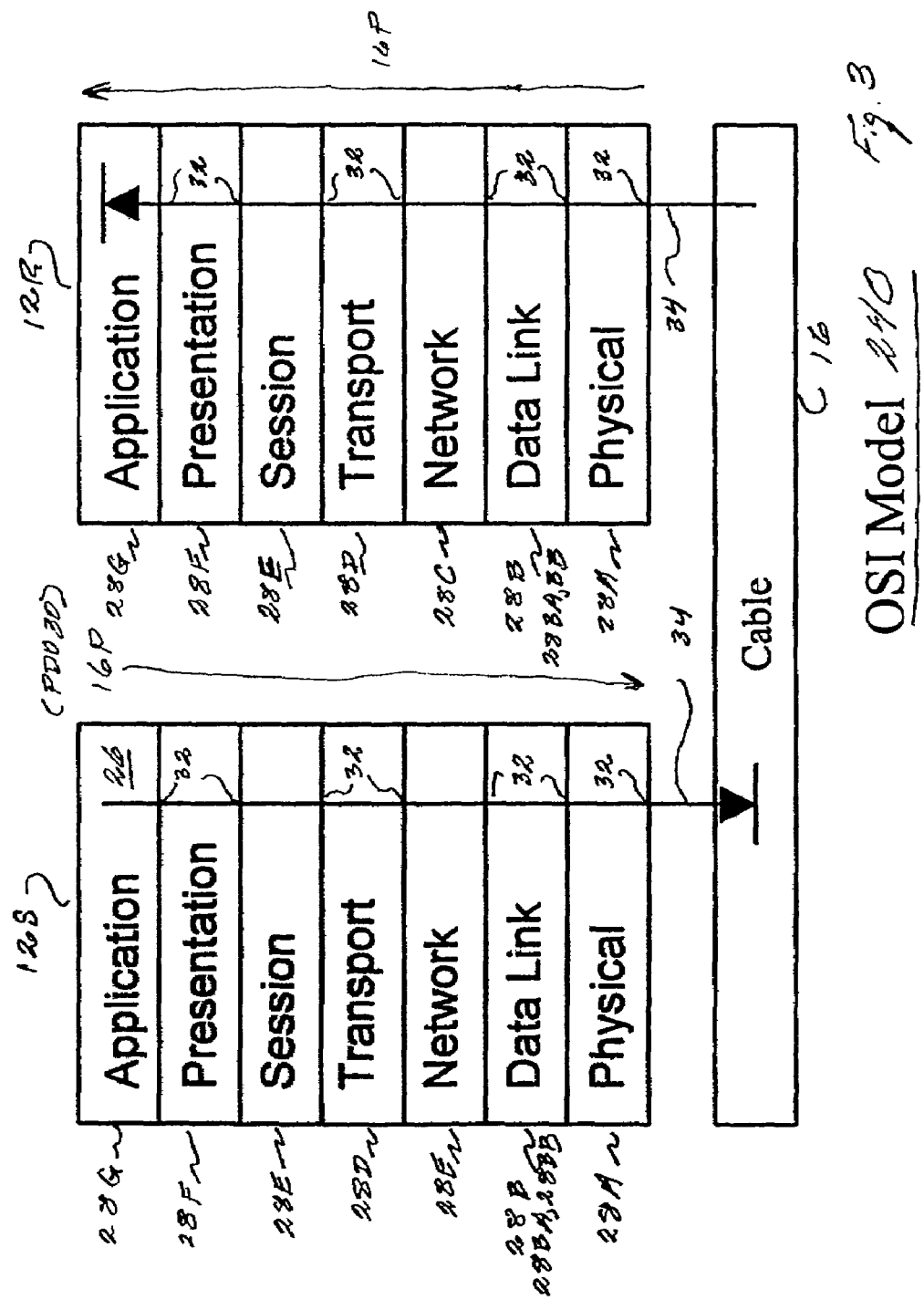
Figure 4:
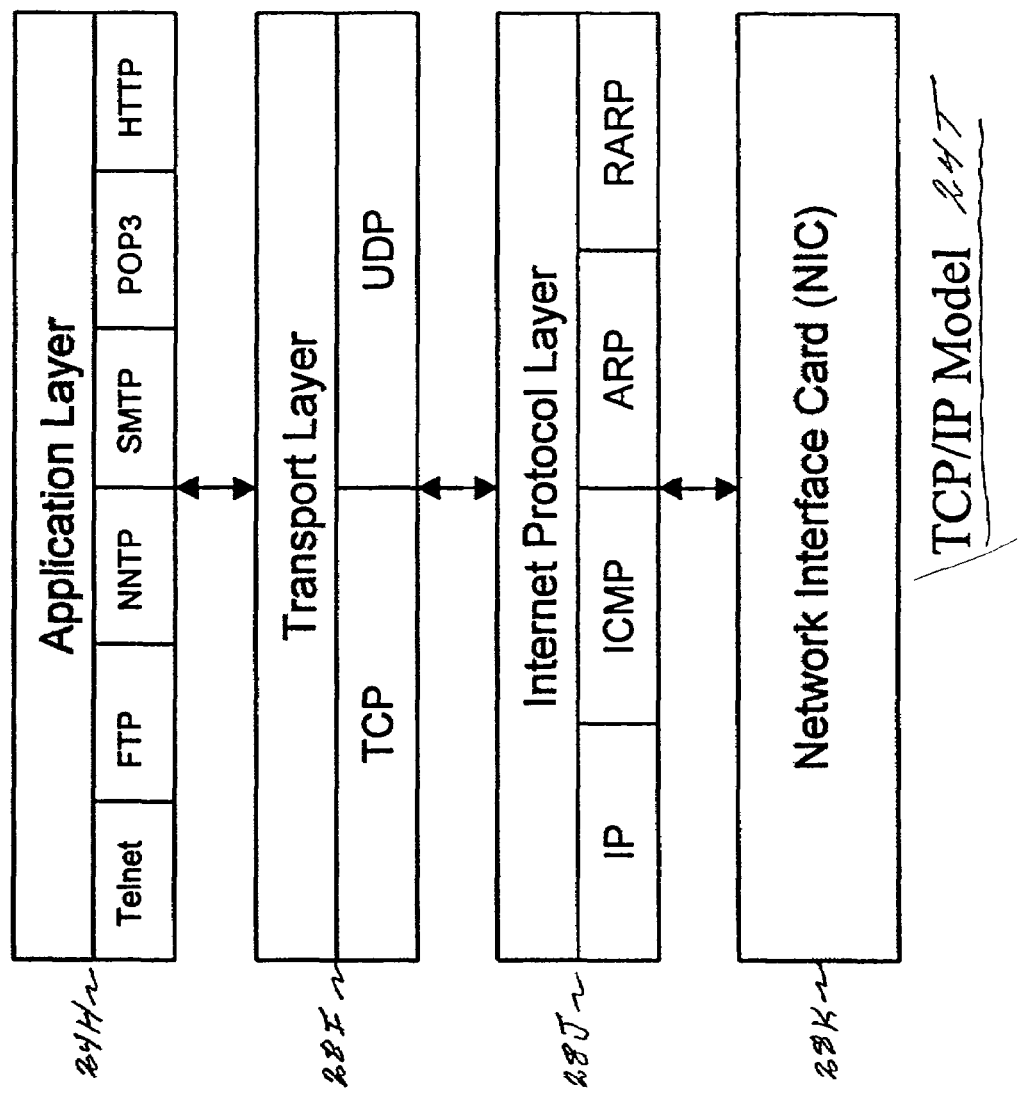
FIG. 4 is a diagrammatic representation of the TCP/IP protocol model.
Figure 5:
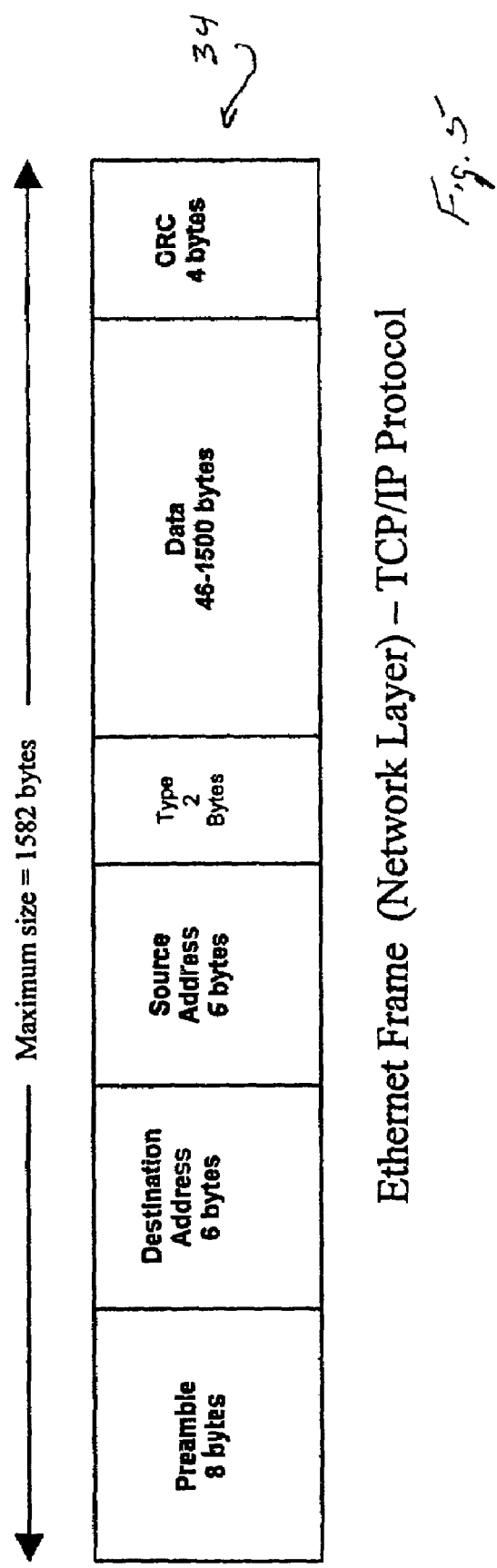
FIG. 5 is a diagrammatic representation of an ethernet frame.

As illustrated generally in FIGS. 3 and 4, a communication Request 26 containing typically originates in a Sending Node 12R at the uppermost Layer 28 of the Protocol 24 and is passed down through the succeeding Layers 28, or stack, in the form of a Protocol Packet 16P, which may be referred to as a Protocol Data Unit (PDU) 30. Layers 28 communicate with the adjacent Layers 28 through one or more Service Access Points (SAPs) 32, and each succeeding Layer 28 in the stack adds its own information to the Protocol Packet 16P. At the lowest level Layers 28, the resulting Packet 16 is encoded into Data Frames 34 and is placed onto the Connection 16 of the Network 10 for transmission to the Receiving Node 12R.

The Data Frames 34 traverse the Connection 16 to the Receiving Node 12R, where the entire process is reversed as the Packet 16 is processed upwards through the Layers 28 of the Protocol 24 stack as a Protocol Packet 16P. As it moves up the stack, each Layer 28 "unwraps" its respective elements of the Protocol Packet 16P that were added to the Protocol Packet 16P by the peer Layer 28 on the Sending Node 12R and thereby receives information from its peer Layer 28 on the Sending Node 12R.

It should be noted that in most communications operations no Layers 28 are bypassed, although certain of the higher Layers 28 may not be utilized in certain instances, and that a Layer 28 on a Sending Node 12R or Receiving Node 12R may not communicate directly with its peer Layer 28 on the other node. That is, peer-to-peer Layer 28 communication only takes place by adding messages to the Protocol Packet 16P and sending the Protocol Packet 16P down through the succeeding Layers 28, across the Connection 16, and then up the stack to the peer Layer 28 on the opposing node. As will be noted in the following discussions, however, certain types of Transmitting Nodes 18 and Receiving Nodes 20, such as routers, operate within only relatively few Layers 28 of a Protocol 24 stack, primary the lower Layers 28. It should also be noted that an Adaptive Packet Mechanism 20 of the present invention may interface and interoperate with a lower Layer 28 of a Protocol 24 Stack.

Referring now to FIG. 3 and first considering the OSI Protocol Model 24O, the OSI Protocol Model 24O is comprised of seven Layers 28 defining a progression of tasks performed in passing information from a user's application to the destination application. The Layers 28 compartmentalize specific functions and each Layer 28 has a well-defined interface and a clearly defined entry and exit point, or SAP 32. Each Layer 28 is thereby transparent to the adjacent Layers 28 and a Connection 16 is "virtual", or transparent, to a Sending Node 12R and Receiving Node 12R. OSI Protocol Model 24O also embodies an "acknowledgment" mechanism wherein, as discussed herein above, a next packet is transmitted by the Sending Node 12R only after receiving an acknowledgment packet for the preceding transmitted packet. Lastly, it should be noted that not all network communications extend to or through all Layers 28 of the OSI Protocol Model 24O. For example, communication between different hosts using reliable TCP/IP communications might traverse every Layer 28 of the OSI Protocol Model 24O, while local Windows for Workgroups communications within the same Network 10 using an IBM Protocol 24 or communication between routers may occur only at the data link Layer 28 and physical Layers 28.

Briefly considering each of the Layers 28 of the OSI Protocol Model 24O, the lowest Layer 28 is Physical Layer 28A, which represents the physical characteristics of the Network 10, such as the transmission media, transmission devices, Network 16 structures and configurations, such as bus, star, ring, and mesh topologies, and the data signals across the transmission media.

The Data Link Layer 28B, in turn, embodies the communication functions of a Network 10, such as a (Local Area Network) LAN. Data Link Layer 28A is responsible for initiating the first level of a rudimentary structure of data bits, the data link Frame 34, controls the flow of data to the destination device. A Frame 34 is organized into fields of information that identify the start and end of the Frame 34, the address of the Sending Node 12R, the address of the Receiving Node 12R, and error checking methods. The Data Link Layer 28B is structured as two sub-Layers 28, wherein the Media Access Control (MAC) sub-Layer 28BA refers to the MAC Protocol 24 which monitors access to the media by giving permission to transmit data, resolving conflicts, passing tokens, and polling. The MAC sub-Layer 28BA also locates the physical addresses at each station on the network, which become the source and destination data on the data link Frame 34. The Logical Link Control (LLC) sub-Layer 28BB, in turn, includes part of the data link administrative or control fields, such as frame synchronization, flow control and error checking within the Frame 34, and a unique address that is located in the Physical Layer 28A. The physical properties of a Network 10 infrastructures such as the Ethernet, Token Ring, or other LAN networking systems, Attached Resources Computer Network (ARCNET), LocalTalk, Fiber Digital Device Interface (FDDI) are thereby defined in the Physical Layer 28, while their communication properties are defined in the Data Link Layer 28B.

Network Layer 28C of the OSI Protocol Model 24O is responsible for network processes to reliably send and receive data between networks. For example, a diagram of a standard Ethernet Frame 34 as may be sent through a Router 24 through Network Layer 28C using the TCP/IP is shown in FIG. 5.

Network Layer 28C provides logical addressing, network routing, flow control that monitors the network connection, and sequencing and translation functions. Addressing is also performed in Network Layer 28, and the form of addressing is specific to a given protocol. For example, an Ethernet workstation may run both TCP/IP and Novell IPX/SPX Network Layer 28C protocols wherein each Network Layer 28C protocol will have a different logical addressing method. The Network Layer 28C protocols, such as TCP/IP, UDP/IP, IPX/SPX, DECNET, are also used by routers to interconnect Networks 16. It must be noted, however, that there are certain Network 10 Protocols 24 that to not extend to the Network Layer 28. These include DECLAT, IBM's Network Basic Input/Output System (NetBIOS), IBM's Extended User Interface (NetBEUI) for NetBIOS, and others. These Protocols 24 have no provisions for Network Layer 28C addressing and routing, so that connection of these Protocols 24 between different LANs must be accomplished with MAC sub-Layer 28BA devices such as LAN bridges or LAN switches.

Transport Layer 28D provides reliable network-to-network communications by providing service addressing, flow control, datagram segmentation, and source to destination error checking. Error checking also occurs in the Data Link Layer 28B and in Session Layer 28E, discussed below. A primary function of Transport Layer 28D is to pack data sent down from higher Layers 28 into smaller pieces, referred to as segments, and to assign each segment a segment number so that the data can be reassembled in the correct sequence and without errors in the Transport Layer 28D in the Receiving Node 12R.

Service addressing is unique to the Transport Layer 28D, wherein Transport Layer 28D identifies addresses or ports pointing to upper Layer 28 network services. This level of addressing also monitors multiple connections or conversions that may occur in a Network 10 by tracking the connection identifiers, that is a connection identifier, port, or socket, or a transaction identifier that can track each request as opposed to tracking a conversion.

Session Layer 28E of the OSI Protocol Model 24O is responsible for establishing, maintaining and terminating a connection to a session. Managing a session involves synchronization of user tasks and dialog control, that is, what process is able to transmit and for what length of time. Synchronization involves the use of checkpoints or "acknowledgment numbering" and retransmission procedures. Session Layer 28E is also responsible for logon, name recognition and security functions and relies on the Transport Layer 28D in these functions.

Presentation Layer 28F of the OSI Protocol Model 24O translates and converts the form and structures of data among the hosts in which the data resides or is transmitted to, thereby allowing the data to be operated upon and with by each host in which it resides. The operations performed by Presentation Layer 28F may, for example, include conversion of file organizations, beginning/ending boundaries, naming conventions, access security and file storage methods. The conversions performed by Presentation Layer 28F are also performed at the byte and character levels, and may include file syntax conversions, encryption/decryption processes and compression/decompression processes. For example, Presentation Layer 28F may convert data using the American Standard Code for Information Interchange (ASCII) and having the left-most bit of a byte of data the highest order or most significant bit into data using IBM's Extended Binary Coded Decimal Interchange Code (EBCDIC) for which the left most bit is the lowest order of least significant bit.

Lastly, Application Layer 28 G of the OSI Model Protocol 24O provides the operating system of the host system with direct access to network services, such as a mail client, a web browser, or file transfers. Application Layer 28G also provides user applications, such as word processing programs, spreadsheet programs and other applications with an interface to the network services to allow, for example, an application program to retrieve a file from a network server.

Referring now to Transmission Control Protocol/Internet Protocol (TCP/IP) Protocol 24T, as illustrated in FIG. 4 the architecture of TCP/IP Protocol 24T includes an Application Layer 28H, a Transport Layer (TCP/UDP) 28I, an Internet Protocol (IP) Layer 28J and a Network Layer 24K. Again, each of Layers 28H through 24K represents specific tasks that are accomplished when data is transmitted utilizing the TCP/IP Protocol 24T, and as each succeeding Layer 28 receives a data packet, that Layer 28 performs its tasks and sends the packet onto the next level Network Layer 24K includes hardware devices for Network 10 communication and programs and processes for controlling communications at the Network 10 hardware level. As in the instance of the OSI Model Protocol 24O, TCP/IP Protocol 24T supports virtual paths through the Network 10 between, for example, Transmitting Nodes 18 and Receiving Nodes 20, and communications configurations such as Asynchronous Transfer Mode, Ethernet and Frame-Relay.

Internet Protocol (IP) Layer 28J, in turn, represents a connectionless datagram protocol that defines standards for message transmission on and between Networks 16, which may be significantly dissimilar. Packet addressing, that is, Internet Protocol (IP) packets, allow error free transmission to be the responsibility of the Transmitting Nodes 18 and Receiving Nodes 20 on an equal peer-to-peer basis, rather than relying on the links in the Network 10 environment. Internet Protocol (IP) Layer 24J also supports can be used for a basis of communication even between dissimilar networks that support dissimilar Protocols 24 using gateway connections.

TCP/IP Protocol 24T is connection oriented packet transport system that establishes a connection between a Sending Node 12R and a Receiving Node 12R before the data is transmitted. Transport Layer 28K is responsible for management and control of data flow, including data flow speed adjustment to minimizes data corruption, and includes the TCP and UDP protocols for these purposes.

In particular, the TCP protocol of Transport Layer 28K includes mechanisms for packet flow control, packet retransmission, packet sequencing and error correction. In the flow control functions, both the transmitting and the receiving node have control over the packet transmission rate in a manner that alleviates the probability of packet overflow. In addition, an acknowledgment of packet reception is transmitted from the receiving node to the transmitting node when a packet reaches a destination, thereby inform the sender that the packet has arrived intact. If the packet does not arrive intact and the sender does not receive acknowledgment within a specified time, the packet is retransmitted. In addition, the packets are numbered and transmitted in sequential order so that, should packets be transmitted or received out of order or should packets have to be retransmitted, the receiving node is enabled to reassemble the packets in the correct order. Finally, the TCP generates and checks a checksum in each packet that records the original data bits of the packet, thereby providing error detection.

UDP protocol of Transport Layer 28I excludes the connection setup process, flow control and retransmission/error checking functions of the TCP protocol, thereby providing minimum transmission delay. The UDP protocol is primarily used, for example, in transmitting IP address data, as the lack of the functions provided by the TCP protocol may result in data degradation.

Lastly, Application Layer 24H establishes client/server application protocols, such as for file transfers, e-mail, web applications, and so on. Such client/server protocols may include, for example, File Transfer Protocol (FTP) for the file transfer and directory management of remote computers, Simple Mail Transport Protocol (SMTP) for e-mail delivery; and the Hyper Text Transport Protocol 24 (HTTP) used on the World Wide Web.

2. Adaptive Packet Mechanism 20 (FIGS. 6A, 6B, and 6C)

It has been described above that a Adaptive Packet Mechanism 20 includes or is comprised of one or more Collector/Controllers 20C and two or more Packet Transfer Engines (PTE) 20T. Packet Transfer Engines (PTE) 20T operate under control of a Collector/Controller (C/C) 20C to determine the network conditions of Connections 18, wherein the network conditions examined by an Adaptive Packet Mechanism 20 pertain to the latency and jitter and the available bandwidth of the Connections 18, and to determine from these network conditions the optimum packet size and optimum inter-packet interval for the transmission of data packets through the Connections 18 for given amounts and types of data. As will be described, an Adaptive Packet Mechanism 20 operates in a number of modes to acquire the network condition information, including the transmission of Monitor Packets 12M through the Connections 18 and by examination of the transmission of Data Packets 12D through the Connections 18. As will be described, the operations and functions of an Adaptive Packet Mechanism 20 are accomplished through a Packet Transfer Engine (PTE) 20T in each Node 12 that is to be a Sending Node 12S or a Receiving Node 12R or both, and a Collector/Controller (C/C) 20C that may reside, for example, in a Sending Node 12S or in a Node 12 separate from the Nodes 12S and 12R.

Figure 6A:
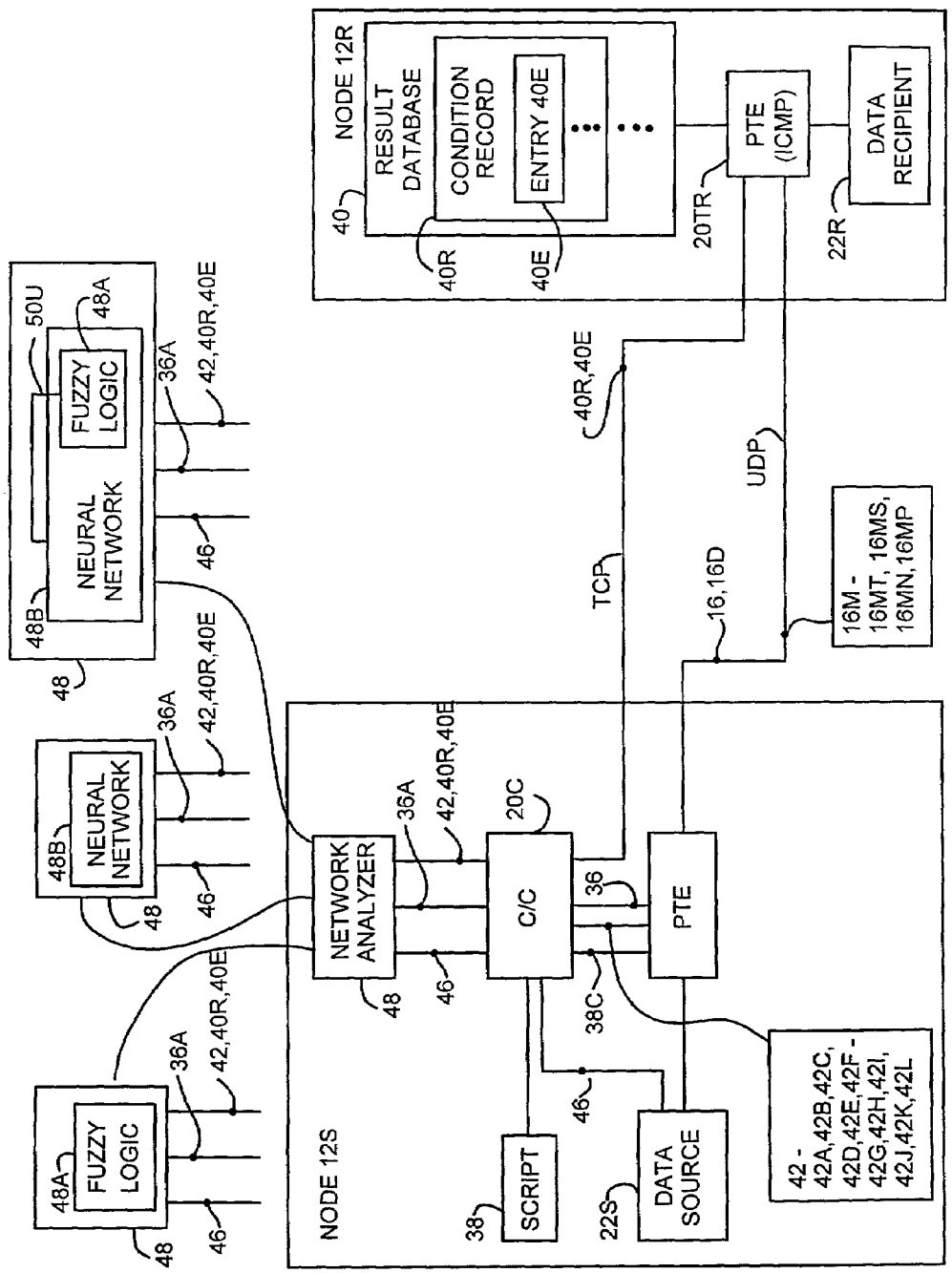
FIG. 6A is a block diagram of an adaptive packet mechanism.

Referring to FIG. 6A, therein is illustrated the structure and operation of an Adaptive Packet Mechanism 20 with respect to a single Connection 18 between a Sending Node 12S and a Receiving Node 12R. As shown therein, a Packet Transfer Engine (PTE) 20T resides in the Sending Node 12S, and will hereafter be identified as the Packet Transfer Engine (PTE) 20TS, and second Packet Transfer Engine (PTE) 20T resides in the Receiving Node 12R, and will hereafter be identified as the Packet Transfer Engine (PTE) 20TR. It will be understood that the designations of Nodes 12 in FIG. 6A as Sending Nodes 12S and Receiving Nodes 12R and the corresponding designations of the Packet Transfer Engines (PTE) 20T as a Packet Transfer Engine (PTE) 20TS and a Packet Transfer Engine (PTE) 20TR are solely for purposes of the present discussions and are not intended or meant to be limiting. For example, the designations of sending and receiving Nodes 12 and Packet Transfer Engines (PTE) 20T would periodically in bi-lateral data packet communication between the Nodes 12, when the flow of data packets reverses, or that a Node 12 may operate as a Sending Node 12S in one Connection 18 and as a Receiving Node 12R in a different Connection 18.

It has also been described herein above that a Collector/Controller (C/C) 20C operating with and controlling the Packet Transfer Engine (PTE) 20TS and Packet Transfer Engine (PTE) 20TR of a Connection 18 may reside in any Node 12 of the Network 10. It will therefore be understood that the Collector/Controller (C/C) 20C is shown in FIG. 6A as residing in Sending Node 12S only for purposes of illustration, and that this representation is not intended or meant to be limiting. As shown in FIG. 6A, and as will be discussed in further detail in a following description, Collector/Controller (C/C) 20C includes or is associated with a Network Analyzer 48 that may be implemented in a number of forms, but which receives the network condition information acquired by Packet Transfer Engine (PTE) 20TS or by Packet Transfer Engine (PTE) 20TS in combination with Packet Transfer Engine (PTE) 20TR and information pertaining to a currently to be executed data transfer to determine the optimum packet size and inter-packet interval under the current Connection 18 conditions and for the amount and type of data to be transferred. As will be discussed in the following, and for example, a Network Analyzer 48 may be implemented as fuzzy logic, or as a neural network or as a combination of a neural network with fuzzy logic, and the mode by which network condition information is acquired and used by the Collector/Controller 20C will be determined in part by the specific method used to implement Network Analyzer 48. In the reverse, the method used to implement Network Analyzer 48 will be determined in part by the methods and modes of operation available to acquire the network information and the types of network condition information that may be acquired.

Also, it has been described that a Packet Transfer Engine (PTE) 20T residing in a Sending Node 12S or a Receiving Node 12R will effectively reside in and function as a Layer 28 or element of a Layer 28 of the Network Protocol Stack (Stack) 24 the Sending Node 12S or Receiving Node 12R to form, transmit and receive Packets 16. For example, in a presently preferred embodiment of an Adaptive Packet Mechanism 20, Packet Transfer Engines (PTE) 20T communicate Monitor Packets 16M and Data Packets 16C at the UDP layer of TCP/IP and communicate with Collector/Controllers 20C at the TCP layer of TCP/IP. It will be recognized and understood, however, that an Adaptive Packet Mechanism 20 may execute or operate with a wide variety of protocols and at a number of different layers of such protocols for the transfer of data through Networks 16. While the type, degree and methods for interoperating with such aspects of the protocols as packet size and inter-packet interval may vary significantly between protocols, such protocols are widely known and well understood by those of ordinary skill in the relevant arts, the details of particular protocols. As such, the means and methods by which various implementations and embodiments of the Packet Transfer Engines (PTE) 20T of the present invention may be adapted to and implemented in each protocol will not be discussed in detail herein.

As described, the Collector/Controller (C/C) 20C, Packet Transfer Engines (PTE) 20TS and Packet Transfer Engine (PTE) 20TR associated with a Connection 18 are capable of multiple modes of operation. For example, in the data transfer mode the Collector/Controller (C/C) 20C, Packet Transfer Engines (PTE) 20TS and Packet Transfer Engine (PTE) 20TR operate to transfer data from the Sending Node 12S to the Receiving Node 12R through the Connection 18. In the network data collection and network condition determination modes, hereafter referred to as the "test" modes, the Collector/Controller (C/C) 20C, Packet Transfer Engines (PTE) 20TS and Packet Transfer Engine (PTE) 20TR associated with a Connection 18 will operate to determine the network conditions of the Connection 18, such as available bandwidth, latency and jitter, and from this information will determine the currently optimum Packet 16 size and inter-packet interval for communicating Data Packets 16C through the Connection 18 for a given amount and type of data.

Considering the modes of operation of an Adaptive Packet Mechanism 20 in general, the Collector/Controller (C/C) 20C and the Packets Transfer Engines 20TS and 20TR may alternate between a data transfer mode of operation in which the data is transferred from the Sending Node 12S to the Receiving Node 12R and a network condition acquisition mode of operation in which information is collected regarding network conditions. In other modes, the Adaptive Packet Mechanism 20 may acquire network condition information during data transfers, that is, by examination of the transmission characteristics revealed during the transmission of Data Packets 12D. In still other circumstances, the Adaptive Packet Mechanism 20 may operate in an initial or preliminary network condition collection mode to acquire network condition information that may be is used, for example, to train a neural network in Network Analyzer 48 or to build a fuzzy logic analyzer for use in Network Analyzer 48. Thereafter, the Adaptive Packet Mechanism 20 may operate in either of the first two mention modes to acquire network condition information to update or modify the network condition information acquired during the initial or preliminary network condition collection operations.

In the network conditon collection modes of operation, and depending upon the specific network condition collection mode, one or both of the Packet Transfer Engines (PTE) 20TS and 20TR of the Connection 18 may acquire network condition information by determining the transmission characteristics of either or both of Monitor Packets 16M or Data Packets 12D transmitted through the Connection 18 from the Sending Node 12S to the Receiving Node 12R, and will extract or determine the current network conditions of the Connection 18, such as available bandwidth, latency and jitter. As described, the network condition information is provided to a Collector/Controller (C/C) 20C, wherein Network Analyzer 48 will determine the optimum packet size and inter-packet interval for the current network conditions of the Connection 18 and Collector/Controller (C/C) 20C will use these optimum packet size and inter-packet interval values during the data transfer mode.

In general, the network condition collection mode selected for given circumstances is is dependent upon both the packet size and inter-packet interval determine methods implemented in the Network Analyzer 48 and the type of data transfer to be executed. In this regard, it has been previously described that data transfers through a network may be characterized as "continuous", wherein the stream of data packets is essentially continuous for an extended period, or "bursty", which is characterized by the transmission of "bursts" of data packets separated by intervals in which no packets are transmitted. A "continuous" transfer may occur, for example, in the transfer of audio/video information while a "bursty" transfer may occur, for example, in the transfer of data files.

As will be described in the following, in a presently preferred embodiment an Adaptive Packet Mechanism 20 is capable of operating in several basic network condition acquisition modes, certain of the modes being intended primarily for "bursty" data transfers and others being primarily intended for "continuous" data transfers while others are used in the preliminary or initial acquisition of network condition information to be used, for example, in training a neural network or in designing a fuzzy logic analyzer. In the case of "bursty" data transfers, there may be or are extended periods during which Data Packets 12D are not being transmitted and during which information regarding the Connection 18 transmission conditions cannot be determined by observation of the Data Packets 12D. In these cases, sequences of Monitor Packets 12M are periodically transmitted between the Sending Node 12S and the Receiving Node 12R, when Data Packets 12D are not being transmitted, and the network conditions of the Connection 18 are determined from the transmission characteristics of the Monitor Packets 12M. In the instance of "continuous" data transmissions, the Connection 18 is essentially fully occupied by the transmission of Data Packets 12D, and the network conditions are primarily determined from observation of the Data Packets 12D.

Before discussing the modes of operation of Collector/Controller (C/C) 20C and Packet Transfer Engines (PTE) 20TS and 20TR in detail, it should be noted that in the presently preferred implementation, the the modes of operation are controlled in part by inputs from Data Source 22S or from some other source in the Sending Node 12S indicating, for example, what type of data transfer operation is to be performed, such as a file transfer or the transmission of a continuous audio/video data stream, and the amount of data to be transferred. The Collector/Controller (C/C) 20C, in turn, selects an appropriate mode of operation for the particular data transfer requested by the Sending Node 12S, including the method by which network conditon information is to be acquired. The Collector/Controller (C/C) 20C, in turn, generates Control Outputs 38C to the Packet Transfer Engines (PTE) 20TS and Packet Transfer Engine (PTE) 20TR to control the modes of operation of the Packet Transfer Engines (PTE) 20TS and Packet Transfer Engine (PTE) 20TR during the requested data transfer. As will be described below, packet transfers between the Sending Node 12S and the Receiving Node 12R will involve both a data transfer mode and one or more network condition collection modes and may require the Collector/Controller (C/C) 20C and the Packet Transfer Engines (PTE) 20TS and Packet Transfer Engine (PTE) 20TR involved in the operation to switch between the data transfer modes and the network condition collection modes during the data transfer. In the presently preferred embodiment, the modes of operation of the Collector/Controller (C/C) 20C and the Packet Transfer Engines (PTE) 20TS and Packet Transfer Engine (PTE) 20TR are determined by flags set in the Collector/Controller (C/C) 20C and the Packet Transfer Engines (PTE) 20TS and Packet Transfer Engine (PTE) 20TR by the Collector/Controller (C/C) 20C.

In this regard, it must be noted that when the Collector/Controller (C/C) 20C, Packet Transfer Engines (PTE) 20TS and Packet Transfer Engine (PTE) 20TR associated with a Connection 18 are operating in a network condition acquisition mode to determine the current network conditions of the Connection 18, the operations of the Adaptive Packet Mechanism 20 are controlled by a Script File 38. As indicated in FIG. 6A, Script File 38 is read by the Collector/Controller (C/C) 20C, which in turn generates corresponding Control Outputs 38C to the Packet Transfer Engine (PTE) 20TS or to both the Packet Transfer Engine (PTE) 20TS and the Packet Transfer Engine (PTE) 20TR, depending upon the network condition acquisition mode. An example of a Script File 38 is illustrated in FIG. 6B and, as script files are well known to those of ordinary skill in the arts and as the purpose and function of each step in the script file is described in the example shown in FIG. 6B, Script Files 38 will not be discussed in further detail herein.

a. Data Transfer Mode

First considering the data transfer mode, that is, the method by which Data Packets 12D are transferred from a Sending Node 12S to a Receiving Node 12R, the Packet Transfer Engines (PTE) 20TS and 20TR residing at the Sending Node 12S and at the Receiving Node 12R will operate as or as part of the data communications Network Protocol Stack (Stack) 24 mechanisms of the Sending Node 12S and the Receiving Node 12R. That is and for example, Packet Transfer Engines (PTE) 20TS and Packet Transfer Engine (PTE) 20TR operate as a Layer 28 of the Transmission Control Protocol/Internet Protocol ("TCP/IP") mechanism to communicate "payload" Data Packets 16C between a Data Source 22S in the Sending Node 12S and a Data Recipient 22R in the Receiving Node 12R. For example, in a presently preferred embodiment of an Adaptive Packet Mechanism 20, Packet Transfer Engines (PTE) 20TS and 20TR communicate Monitor Packets 16M and Data Packets 16C at the UDP layer of TCP/IP and communicate with Collector/Controllers 20C at the TCP layer of TCP/IP.

In the data transfer mode, and according to the present invention, the Collector/Controller (C/C) 20C will provide a Packet Control 36 output to the Packet Transfer Engine (PTE) 20TS in the Sending Node 12R wherein the Packet Control 36 output will designate an Optimum Packet Size 36S and an Optimum Inter-Packet Interval 36I for the current Connection 18 network conditions. The Packet Transfer Engine (PTE) 20TS will receive Data 22D from the Data Source 22S or from higher Layers 28 of the Network Protocol Stack (Stack) 24, depending upon the Layer 28 at which the Packet Transfer Engine (PTE) 20TR is implemented, and will "packetize" the Data 22D into Data Packets 16C of the size designated by the Optimum Packet Size 36S. The Packet Transfer Engine (PTE) 20TS will transmit the Data Packets 16C to the Connection 18 at inter-packet intervals designated by Optimum Inter-Packet Interval 36I, either directly or through lower Layers 28 of the Network Protocol Stack (Stack) 24, depending upon the Layer 28 at which the Packet Transfer Engine (PTE) 20TS is implemented.

The Data Packets 16C are transferred through the Connection 18 to the Receiving Node 12R, and the Packet Transfer Engine (PTE) 20TR will receive the Data Packets 16C from the Connection 18, either directly or from lower Layers 28 of the Network Protocol Stack (Stack) 24, depending upon the Layer 28 at which the Packet Transfer Engine (PTE) 20TR is implemented. The Packet Transfer Engine (PTE) 20TR will "depacketize" the Data 22D and will pass the Data 22D to the Data Recipient 22R, either directly or through higher Layers 28 of the Network Protocol Stack (Stack) 24, again depending upon the Layer 28 at which the Packet Transfer Engine (PTE) 20TR is implemented. The Packet Transfer Engine (PTE) 20TS will form the Data 22D into Data Packets 16C of the size designated by Optimum Packet Size 36S and will transmit the Data Packets 16C at the inter-packet interval designated by Optimum Inter-Packet Interval 36I.

b. Network Condition Acquisition Mode, Monitor Packets 12M

In a first network data collection and network condition determination mode, the Transfer Engine 20TS residing at the Sending Node 12S of a Connection 18 will, under the direction of the Collector/Controller (C/C) 20C, transmit sequences of one or more Monitor Packets 16M to the Transfer Engine 20TR residing in the Receiving Node 12T of the Connection 18 at predetermined intervals. In a presently preferred embodiment of the invention, each sequence of Monitor Packets 12M may contain, for example, 10 Monitor Packets 12M and sequences will be transmitted at, for example, 2 second intervals. The Packet Transfer Engine (PTE) 20TR residing in the Receiving Node 12R will reflect or echo the Monitor Packets 16M back to the Packet Transfer Engine (PTE) 20T residing in the Sending Node 12S. The Packet Transfer Engine (PTE) 20TS will extract Monitor Packet 16M transmission characteristics directly representing the network condition of the Connection 18 from the returned or echoed Monitor Packets 12M, will determine the network conditions of the Connection 18, such as available bandwidth, latency and jitter, and will provide the network condition information to a Collector/Controller (C/C) 20C.

The transmission and reflection of Monitor Packets 12M may be employed in the acquisition of network condition information, for example, during the "bursty" transmission of Data Packets 12D, that is, in the intervals between the transmission of Data Packets 12D. In further example, the transmission and reflection of Monitor Packets 12M may be employed during a preliminary or initial acquisition of network condition information, as will be discussed further below, to acquire network condition information to be used in training a neural network implemented in Network Analyzer 48, or during operation of an Adaptive Packet Mechanism 20 in transmitting data to acquire network condition information for use in updating or modifying a neural network implemented in Network Analyzer 48. As will also be described below, the transmission and reflection of Monitor Packets 12M may further be used to obtain network condition information for use in the design of fuzzy logic used in a Network Analyzer 48.

Further with respect to this mode of operation, and as discussed below, the Packet Transfer Engine (PTE) 20TR residing in the Receiving Node 12R may extract and store network condition information pertaining to the Connection 18 for archival purposes and for subsequent use, and may store this information in the Result Entries 40E of Network Condition Records 40R in a Result Database 40. Such information may be used, as described below, in acquiring initial or preliminary network condition information for training a neural network implemented in the Network Analyzer 48, or for use in designing fuzzy logic used in a Network Analyzer 48. In addition, the Packet Transfer Engine (PTE) 20TR residing in the Receiving Node 12R may transmit the network condition information, that is, the corresponding Result Entry 40E or Network Condition Record 30R, to the Collector/Controller (C/C) 20C as it is acquired, that is, in real time, to be used in updating or modifying a neural network implemented in the Network Analyzer 48.

Briefly considering Monitor Packets 16M and Data Packets 16C and the operation of the present invention in general, it has been described herein above that according to the present invention the available bandwidth, latency and jitter of a given Connection 18 is a function of the size of Packets 16 and of the inter-packet interval between successive Packets 16, that is, the intervals between Packets 16 that are transmitted consecutively through the Connection 18. The method and mechanism of the present invention determines the packet size and inter-packet interval that utilizes the maximum available bandwidth of the connection most efficiently under current network latency, jitter and traffic conditions, thereby maximizing the effective data transfer rate. In this regard, it is well known and understood by those of ordinary skill in the arts that a given Packet 16 is comprised of one or more fields of control bits or bytes, often referred to as "header" bits or bytes, used in managing and controlling the network transmission of the Packets 16, and one or more fields of data, which are the actual "payload" of a Packet 16. As such, the size of a Packet 16, that is, the number of bits or bytes contained in a Packet 16, is comprised of a fixed number, primarily comprised of the control or header fields, and a controllable number comprised of the data fields. It has been described that an Adaptive Packet Mechanism 20 controls the size of Packets 16 to be an optimum for the current network conditions of a Connection 18, and it will therefore be apparent that an Adaptive Packet Mechanism 20 does so by controlling the size of the data fields of the Packets 16 as the control or header fields are typically determined by the communications protocol employed by the Sending Node 12S and Receiving Node 12R. The range of Packet 16 sizes will thereby range from a minimum determined primarily by the size of the control or header fields of the Packets 16 to a maximum determined by the communications protocol employed by the Sending Node 12S and Receiving Node 12R 24 executed by Network Interface Mechanism 26 and will include both the control or header fields and the maximum capacity of the data fields. As such, it will be understood that within the context of the present invention the size of a Packet 16, whether a Data Packet 16C or a Monitor Packet 16M, will be a function of both the control or header fields and the data fields.

Referring to FIG. 6A, therein is illustrated an exemplary Monitor Packet 16M as may be used in a presently preferred implementation of this mode of operation. In the presently preferred embodiment, the Packet Transfer Engine (PTE) 20TS will transmit a sequence of 10 (ten) such Monitor Packets 12M, to allow the Adaptive Packet Mechanism 20 to obtain information pertaining to, for example, the average available bandwidth of the Connection 18 and the average jitter between Packets 16 over the Connection 18 over a sample of Monitor Packets 12M, and information pertaining to the extent the Packets 16 may arrive in a sequence that is out of order from the sequence in which they were transmitted. It must be noted that FIG. 6A illustrates, in particular, the data fields or "payload" of a Monitor Packet 16M, which in a presently preferred embodiment is referred to as a "28 byte packet". As shown in FIG. 6A, and for example, a Monitor Packet 16M may include a Departure Time 12MT representing the time of departure of the Monitor Packet 16M from the Packet Transfer Engine (PTE) 20T, a Packet Size 16MS representing the size of the Monitor Packet 16M, and Packet Number 16MN representing the sequential position of the Monitor Packet 16M in a sequence of Monitor Packets 16M. A Monitor Packet 16M may also include a Transmission Parameters 16MP, which may be comprised, for example, of the current Packet Control 36 representing the currently determined or predicted Optimum Packet Size 36S and Optimum Inter-Packet Interval 36I.

As described, the Monitor Packets 16M of the sequence of Monitor Packets 16M transmitted from the Sending Node 12S to the Receiving Node 12R are reflected or echoed back to the Sending Node 12S by the Packet Transfer Engine (PTE) 20TR as they are received by the Packet Transfer Engine (PTE) 20TR, that is, immediately upon being received, or a rapidly as feasible, and in the order in which they are received. The Packet Transfer Engine (PTE) 20TS may determine the times and sequence of arrival of the reflected or echoed Monitor Packets 16M returned from the Packet Transfer Engine (PTE) 20TR and will extract and determine Network Conditions 42. The Packet Transfer Engine (PTE) 20TS will provide Network Conditions 42 to the Collector/Controller (C/C) 20C, and, as described below, the Collector/Controller (C/C) 20C will determine a current Packet Control 36 representing the currently determined or predicted Optimum Packet Size 36S and Optimum Inter-Packet Interval 36I from the Network Conditions 42.

In one embodiment of Adaptive Packet Mechanism 20, Network Conditions 42 will include information pertaining to or representing, for example, such factors as the average available bandwidth of the Connection 18, jitter values for the Connection 18, and the occurrence or percent of Packets 16 that were received out of order, with these factors being determined for the interval in which the Monitor Packets 16M were transmitted and received back over the Connection 18. For example, Network Conditions 42 may include, for example, Average Available Bandwidth 42A, Average Jitter 42B, Maximum Jitter 42C, Minimum Jitter 42D, Packet Order Number Causing Maximum Jitter 42E and Packet Order Number Causing Minimum Jitter 42F.

In this embodiment, Average Available Bandwidth 42A is determined as the total number of bytes communicated in the sequence of Monitor Packets 12M divided by one half of the round trip interval required for the sequence of Monitor Packets 12M to be sent from the Packet Transfer Engine (PTE) 20TS and the returned Monitor Packets 12M of the sequence of Monitor Packets 12M to be received by the Packet Transfer Engine (PTE) 20TS. The average round trip latency of the Connection 18 may, in turn, be determined as the average of the differences between the departure time of each Monitor Packet 12M from the Packet Transfer Engine (PTE) 20TS and the arrival time of the returned Monitor Packet 12M at the Packet Transfer Engine (PTE) 20TS, and the one way latency of the Connection 18 may be determined as one half of the round trip latency. The jitter of each Monitor Packet 12M may be determined by a number of methods. For example, the expected arrival time of each Monitor Packet 12M for zero jitter can be determined from the departure time of each Monitor Packet 12M from Packet Transfer Engine (PTE) 20TS and the average round trip latency of the Connection 18. The expected arrival time of each Monitor Packet 12M may then be compared with the actual arrive time of each Monitor Packet 12M at the Packet Transfer Engine (PTE) 20TS, and one half of this difference will represent the jitter for that individual Monitor Packet 12M. It will also be noted that jitter, which is the packet to packet variation in latency through the Connection 18, may also be determined relatively by determining the interval between the arrivals of successive packets and comparing these measured values to the inter-packet interval specified in the Monitor Packet 12M. The Average Jitter 42B, in turn, may be determined as the average of the individual jitter values, and the Maximum Jitter 42C and Minimum Jitter 42D as the maximum and minimum of the individual jitter values. Finally, the Packet Order Number Causing Maximum Jitter 42E and Packet Order Number Causing Minimum Jitter 42F may be determined from the Packet Numbers 12MC of the Monitor Packets 12M having the Maximum Jitter 42C and Minimum Jitter 42D values.

In another and presently preferred embodiment of the invention, the Network Conditions 42 may be comprised of or include 2-Way Delay Maximum 42G, 2-Way Delay Minimum 42H, 2-Way Delay Average 42I, Jitter Average 42J, Number of Packets Out of Sequence 42K and Number of Packets Lost 42L. It will be noted that these values are similar to or are derived in a manner similar to those of Network Conditions 42A through 42F, except that the delays or times are determined in terms of the round trip times from Packet Transfer Engine (PTE) 20TS to Packet Transfer Engine (PTE) 20TR and back to Packet Transfer Engine (PTE) 20TS, rather than one half of these times. It will also be noted that the bandwidth of the Connection 18 is represented indirectly as a maximum and minimum latency for the round trip as the number of bytes transferred during these periods is known, and that jitter is represented by the average jitter only rather than also be the maximum and minimum jitters. Another difference is that changes in the order of packets during transmission over the Connection 18 is represented by the number of packets that are out of order rather than by values representing the packets having the maximum and minimum jitters, and in that the Network Conditions 42 now include the number of packets lost.

It should be noted that in other implementations of Packet Transfer Engines (PTE) 20T and Collector/Controller (C/C) 20C, the Packet Transfer Engines (PTE) 20TS will perform basic measurement operations, such as reading departure time and packet sequence number information from Monitor Packets 12M and determining the arrival times of the returned Monitor Packets 12M. The Packet Transfer Engine (PTE) 20TS will provide the basic measurement information to the Collector/Controller (C/C) 20C, which will perform the operations to extract or determine Network Conditions 42, such as Average Available Bandwidth 42A, Average Jitter 42B, Maximum Jitter 42C, Minimum Jitter 42D, Packet Order Number Causing Maximum Jitter 42E and Packet Order Number Causing Minimum Jitter 42F.

It must be also noted with regard to the determination of Network Conditions 42 that in the present embodiment of this mode of operation such network condition values as latency, jitter and available bandwidth are determined with respect to "round trip" times. That is, and for example, bandwidth and latency are determined with respect to one half of the round trip intervals or times for the Monitor Packets 12M to be transmitted through the Connection 18 and returned through the Connection 18. It is therefore assumed that the latency and jitter of the transmission path through a Connection 18 is equal in both directions of transmission, or is sufficiently equal for purposes of the present invention. In this regard, it must be noted that the clocks residing in the Sending Node 12S and Receiving Node 12R of a Connection 18 are typically not synchronized, or at least are not synchronized to the degree of accuracy required to measure differences or changes in latency and jitter. The determination of latency and jitter through a Connection 18 by determining the departure and arrival times of Monitor Packets 12M at the Packet Transfer Engine (PTE) 20TS, that is, at a single end of the Connection 18, thereby obviates or alleviates the problem of non-synchronization between the Sending Node 12S and Receiving Node 12R clocks by using only a single clock for all measurements. It will be further noted that this method is in accordance with a basic principle of the present invention, that is, treating a Connection 18 and all elements of a Connection 18 as a "black box" for purposes of determining the optimum packet size and inter-packet interval to make optimum use of the available Connection 18 bandwidth.

c. Network Condition Acquisition, Condition Records 40R and Test Result Entries 40E It has been described herein above that the Packet Transfer Engine (PTE) 20TR residing in the Receiving Node 12R may extract and store network condition information pertaining to the Connection 18 for archival purposes and for subsequent use, and may store this information as a set of Test Result Entries 40E in a Network Condition Record 40R in a Result Database 40. An exemplary Network Condition Record 40R is illustrated in FIG. 6C, wherein it will be seen that a Condition Record 40R may include, and for example, Network Test Result Fields 44A through 44AC. It will be noted that the values or information contained in each of Network Test Result Fields 44A through 44AC are defined in the exemplary Network Condition Record 40R shown in FIG. 6C. It will further be noted that certain of the values or information residing in Network Test Result Fields 44A through 44AC are the same as or similar to those determined for Network Conditions 42.

The determination of these and other values and information contained in Network Test Result Fields 44A through 44AC will be apparent to those of ordinary skill in the relevant arts, with the assistance of the definitions of the values and contents of the fields provided in FIG. 6C, and therefore will not be discussed further herein. In this regard, and as discussed above, it must be noted that the clocks residing in the Sending Node 12S and Receiving Node 12R of a Connection 18 are typically not synchronized, or at least are not synchronized to the degree of accuracy required to measure differences or changes in latency and jitter. Certain values, however, such as jitter, which is the packet to packet variation in latency through the Connection 18, may be determined relatively by determining the interval between the arrivals of successive packets and comparing these measured values to the inter-packet interval specified in the Monitor Packet 12M. Other Test Result Field 44 values or information, however, may be more readily determine at the Packet Transfer Engine (PTE) 20TR end of a Connection 18 than at the Packet Transfer Engine (PTE) 20TS end of the Connection 18. For example, the Monitor Packet 12M will identify the number of Monitor Packets 12M in the test sequence, and the number of packets received or number of reads or attempted reads to a socket or number of lost packets are more accurately determined by the Packet Transfer Engine (PTE) 20TR as the possibility of a lost or erroneous packet during the return transmission is eliminated. It will also be noted that Test Result Fields 44 include values or information not obtained by the Packet Transfer Engine (PTE) 20TS, such as the trend in delay or jitter times, while may be obtained by comparison of the arrival times of Monitor Packets 12M at the Packet Transfer Engine (PTE) 20TR and are not dependent upon synchronization between the Sending Node 12S and Receiving End 12R clocks.

The network condition information acquired in and by the Packet Transfer Engine (PTE) 20TR may be used in a number of ways. For example, Monitor Packets 12M may be transmitted through one or more Connections 18 as described above during an initial or preliminary period before startup or initialization of the full, in-use operation of an Adaptive Packet Mechanism Network 20 to acquire network condition information about the Connections 18. The stored Condition Records 40R and Result Entries 40E collected in a Result Data Base 40 may then be used, for example, for the initial training of a neural network implemented in the Network Analyzer 48, or in the design of a fuzzy logic analyzer implemented in the Network Analyzer 48.

The network condition information acquired in and by a Packet Transfer Engine (PTE) 20TR through the transmission of Monitor Packets 12M as described above, that is, the Condition Records 40R or Result Entries 40E may also be transmitted to the Collector/Controller (C/C) 20C in real time, that is, during operation of the Adaptive Packet Mechanism 20 in transmitting Data Packets 12D from a Sending Node 12S to a Receiving Node 12R. As described, these Monitor Packets 12M may be transmitted, for example, during "bursty" transmissions in the intevals when Data Packets 12D are not being transmitted, thereby allowing the acquisition of network condition information by the Packet Transfer Engine (PTE) 20TR in real time and during the use of the Adaptive Packet Mechanism 20 to transmit Data Packets 12D, so that the information in the Condition Records 40R or Result Entries 40E represents current conditions in the network. This information may then be used to update or modify, for example, a neural network implemented in the Network Analyzer 48 so that the operations of the neural network are continuously updated to reflect current conditions in the network. It should be noted that the "real time" collection of network condition information by a Packet Transfer Engine (PTE) 20TR, the information may be transmitted to the Collector/Controller (C/C) 20C at the conclusion of the sequence of Monitor Packets 16M, or as each Monitor Packet 12M is received.

d. Network Conditions Acquisition, Continuous Transfer

As discussed above, an Adaptive Packet Mechanism 20 may execute continuous data transfers, such as the transfer of audio/video data, wherein the Connection 18 is essentially completely occupied in transferring Data Packets 12D for extensive periods. This mode is similar in may respects to the network condition acquisition modes described above, except that the network condition information is extracted from the transmission characteristics of the Data Packets 12D rather than from Monitor Packets 12M, although Monitor Packets 12M may be transmitted and used in, for example, intervals between or pauses in the transmission of the Data Packets 12D. In general, however, the network condition information represented in a Condition Record 40R or Result Entry 40E will be extracted or determined in the same manner as in the first and second test modes described above. For example, the Data Packets 12D will typically include information identifying the number of bytes contained therein, departure time, and so on. Other values, such as inter-packet interval, may be obtained from Control Outputs 38C or may be averaged values determined from the arrival times of Data Packets 12D and jitter measurements may be determined as in the first and second test modes. It should be noted, however, that in this mode the information represented in Condition Records 40R will be the primary source of network condition information provided to the Collector/Controller (C/C) 20C, rather than information acquired at the Packet Transfer Engine (PTE) 20TS. It should also be noted that certain network condition values or information may be ascertained, for example, either as periodic samples, such as for successive groups of ten Data Packets 12D, or a "running window" values that are updated for each new received Data Packet 12D.

e. Single Ended Operation

Lastly, and as indicated in FIG. 6A, an Adaptive Packet Mechanism 20 may be implemented in a "single ended" configuration which does not require a Packet Transfer Engine (PTE) 20TR in the Receiving Node 12R. Instead, and as indicated in FIG. 6A, the essential or basic functions of the Packet Transfer Engine (PTE) 20TR are implemented through and by the ICMP of the Internet Protocol Layer 28J of the TCP/IP Model 24T, as illustrated in FIG. 4. As is well known to those of ordinary skill in the relevant arts, the ICMP of a Node 12 receiving a Packet 16 performs a "ping" function by transmitting an acknowledgement of a received Packet 16 to the Node 12 transmitting the Packet 16. In this mode of operation, therefore, each Monitor Packet 12M or Data Packet 12D transmitted by the Packet Transfer Engine (PTE) 20TS of a Sending Node 12S will be acknowedged by an acknowledgement from the ICMP of the Receiving Node 12R. The receipt of an ICMP acknowledgement for each Monitor Packet 12M or Data Packet 12S will therefore allow the Packet Transfer Engine (PTE) 20TS to determine such Network Conditions 42 as the latency of the Connection 18, as the round trip time of the transmitted Packet 16 plus the time required for return of the acknowledgement, and from this information such Network Conditions 42 as the jitter of each Packet 16, in a manner similar to that described above with regard to Monitor Packets 12M. Depending upon the Connection 18 and other factors, it may be possible to also determine such factors as the order in which the Packets 16 are received by the Receiving Node 12R. It will be noted, however, that this method will not generate, for example, the network condition information described above with regard to Condition Records 40R or Result Entries 40E. As a consequence, this method is difficult to implement with a neural network based Network Analyzer 48 is there will typically be insufficient network information, either as a historic record or in real time, to train or update a neural network. As such, this method is preferable implemented with a Network Analyzer 48 based upon a fuzzy logic analyzer, as described in a following discussion.

In summary, therefore, an Adaptive Packet Mechanism 20 may operate in a number of modes, including, for example:

(a) The data transfer mode wherein Data Packets 12D are transmitted in either a continuous mode or a bursty mode and wherein the packet sizes and inter-packet intervals are determined by network conditions, including Connection 18 latency and jitter and available bandwidth but also possibly including such factors as packet loss, and the amount and type of data to be transferred.

(b) A reflected Monitor Packet 12M mode wherein Monitor Packets 12M are transmitted during an initial network condition information acquistion period to generate Condition Records 40R and Result Entries 40E to be used in the initial training of a neural network in Network Analyzer 48.

(c) A reflected Monitor Packet 12M mode wherein Monitor Packets 12M are transmitted during operation of the Adaptive Packet Mechanism 20 to generate Condition Records 40R and Result Entries 40E to be returned in real time to the Collector/Controller (C/C) 20C to be used in the updating or modification of a neural network in Network Analyzer 48 according to current network conditions.

(d) A reflected Monitor Packet 12M mode wherein Monitor Packets 12M are transmitted during operation of the Adaptive Packet Mechanism 20 to generate Network Condition 42 during operation of the Adaptive Packet Mechanism 20.

(e) A continuous transmission mode wherein Condition Records 40R and Result Entries 40E are generated in real time from the observed transmission characteristics of Data Packets 12D transmitted by the Packet Transfer Engine (PTE) 20TS and are returned in "real time" to the Collector/Controller (C/C) 20C. This information may be used, for example, in the updating or modification of a neural network in Network Analyzer 48 according to current network conditions or in the same manner as Network Conditions 42.

(f) A "single ended" mode similar to the reflected Monitor Packet 12M modes but wherein the basic functions of the Packet Transfer Engine (PTE) 20TR are peformed by the "ping" or acknowledgement function of the ICMP of the Internet Protocol Layer 28J of the TCP/IP Model 24T.

It must be noted with respect to the above summarized modes of operation of an Adaptive Packet Mechanism 20 that the various modes of operation may be interleaves, as when the data transfer mode is interleaved with the reflected Monitor Packet 12M mode during a "bursty" data transfer. Certain of the modes of operation may be performed alone, however, as when a reflected Monitor Packet 12M mode is used to generate Condition Records 40R and Result Entries 40E for use in training a neural network, or when the data transfer mode is used alone in the continuous transmission mode.

e. Description of Collector/Controller (C/C) 20C (FIG. 6A)

As indicated in FIG. 6A, information representing the current network packet transmission characteristics or properties of a Connection 18 are provided to Collector/Controller (C/C) 20C, together with information pertaining to a present data transfer to be executed, and Collector/Controller (C/C) 20C in return generates a Packet Control 36 output indicated the present Optimim Packet Size 36S and Optimum Inter-Packet Interval 36I. As discussed above, the current network packet transmission characteristics may be provided as Network Conditions 42 from Packet Transfer Engines (PTE) 20TS or as a Condition Record 40R or as Condition Record Entries 40E from the Packet Transfer Engine 20TR. As shown, information pertaining to the current request for a data transfer is contained in a Transfer Request 46 from a Data Source 22S, which identifies, for example, the type of data transfer requested and the amount of data to be transmitted. In this regard, it should be noted that a Transfer Request 46 may be submitted by a Sending Node 12S, either at its own initiative or in response to a request from a data request from a Receiving Node 12R or may be submitted by a Receiving Node 12R as part of a data request to a Sending Node 12S. In either instance the Packet Control 36 outputs will be provided to the Sending Node 12S and possibly to the Receiving Node 12R, depending upon the type of data transfer to be performed.

It will be apparent from the above discussions that Network Conditions 42 directly or indirectly represent a significant number of network variables and that the relationship of these variables to the current optimum packet size and inter-packet interval is complex, often nonlinear and variable with time. In addition, and as a consequence, the number of possible combinations of values of these network variable will be extremely large. In addition, and according to the present invention, it is necessary for the Adaptive Packet Mechanism 20, and in particular the Network Analyzer 48, to be able to determine the optimum packet size and inter-packet interval for current connection conditions in "real time" because of the rapid variability of connection transmissioin conditions.

There are, however, a number of methods for determining solutions to problems having large number of complexly related variables and that will meet the requirements and needs of an Adaptive Packet Mechanism 20 of the present invention, many of which will be well known to those of ordinary skill in the relevant arts. For example, two of these methods are referred to as "fuzzy logic" and "neural networks", each of which have different characteristics and advantages and disadvantages and each of which may be used for the functions performed by an Adaptive Packet Mechanism 20. As will be described below, and as illustrated in FIG. 6A, a Collector/Controller (C/C) 20C of the present invention may include or be functionally associated with Network Analyzer 48 for determining the current packet size and inter-packet interval for a given set of current Network Conditions 42 and a current Transfer Request 46. A Network Analyzer 48 may be implemented by a variety of methods and mechansism, depending upon the requirements for a given Collector/Controller (C/C) 20C. Collector/Controller (C/C) 20C may include of be associated with, for example, a Fuzzy Logic Analyzer 48A, a Neural Network 48B or a Combined Analyzer 48C including a Fuzzy Logic Analyzer 48CA and a Neural Network 48CB. Each of these implementations will be discussed below but, as each of these methods are well known to those of ordinary skill in the relevant arts, each will be described only briefly.

First briefly considering fuzzy logic, fuzzy logic is a method for determining the degree to which an entity represented by a set or subset of characteristics is a member of a group as a function of the values of the characteristics. A fuzzy logic system may be conceptualized as a multidimensional space wherein each dimensional axis of the space corresponds to a characteristic and wherein the groups are defined as regions of the multidimensional space and wherein the regions may be exclusionary or may overlap to any degree. In identifying the degree to which a given set or subset of the characteristics is a member of one or more groups, the multidimensional space is indexed along each axis corresponding to a characteristic of the set or subset and by the value of each characteristic of the set or subset. The point identified in the space by the intersection of the values of the characteristics identifies the location of the set or subset of characteristics with respect to the defined regions, and thereby the degree to which the set or subset of characteristics is a member of one or more of the regions. In the present instance, the set or subset of characteristics are defined by some or all of Network Conditions 42 and the group is one or more of the classifications or categorizations of the network or connection condition as uncongested, moderately congested or congested.

A Fuzzy Logic Analyzer 48A is advantageous in that fuzzy logic systems are relative efficient and require relatively little processing resources of a system and are relatively fast, that is, the time between providing characteristic value inputs and a receiving an output indicating degrees of group membership is relatively short. A disadvantage is that fuzzy logic systems inherently and customarily have no learning or adaptation facilities, and are thereby less suited to systems in which the values or ranges of characteristic values or of the membership regions change over time. Essentially, fuzzy logic systems cannot be "trained" over time, or "learn" as circumstances change, but must be updated by redefinition of the membership regions, and possibly by reconstruction of the system. Fuzzy logic systems are thereby most efficient and effective in smaller systems and in systems in which the characteristic values or ranges of values and the membership regions do not change extensively with time.

Neural Networks 48B, in contrast, are specifically developed and designed as systems that may perform many of the same functions as fuzzy logic systems, that is, generating outputs representing decisions based upon input information, but have the capability of "learning", or of being "trained", both initially and over time.

A neural network is essentially a decision making system or process modeled loosely on the human brain and is functionally comprised of neuron functions organized in layers and linked in various configurations to adjacent neurons in the same layer and to neurons in higher or lower layers. Each neuron is capable of performing certain defined and limited logic and decision making operations upon input information, which may be input information or an output of a lower layer neuron or a neighbor neuron of the same level, and of passing the results of these operations to subsequent neurons or as output signals. Neural networks are "taught" or "trained" by changing of the "weights" of the inter-neuron connections, wherein the "weights" are retained in the neurons and thereby effectively comprise a "memory" of the training or "experience". There are various forms and methods of training neural networks and the presently preferred embodiment of a Neural Network 48B employs the method referred to as "back propagation" wherein the network is provided with both reinforcement for correct decisions and error information, both of which are used to adjust the connections and connection weights between neurons. Lastly, it should be noted that neural networks may be designed for both "off line" and "on line" learning. In this regard, when a neural network is using input information to change the neuron interconnection weights, the network is said to be in "learning" or "training" mode and, when the network is operating to generate decisions based on the input information, the network is said to be in the "operation" or "recall" mode. In "off line" training, the neuron interconnection weights are fixed, that is, do not change, during operation or recall node, so that the basis for decisions does not change in operation mode. In "on line" training, the neuron interconnection weights may change during the operation node, so that the network "learns" dynamically as it is making decisions.

Neural Networks 48B are relatively expensive in system resources and are relatively slow to train. However, because of their capability for learning and adapting, Neural Networks 48B are advantageous in larger and more complex Network Systems 10 where the membership regions of a Fuzzy Logic Analyzer 48A may be difficult to define initially and in systems wherein the values or ranges of values of the input characteristics or the ranges of required decisions are expected to change significantly over time.

Lastly, it is illustrated in FIG. 6A that one preferred embodiment of a Collector/Controller (C/C) 20C is implemented with an associated Combined Analyzer 48C comprising a Fuzzy Logic Analyzer 48CA and a Neural Network 48CB operating in conjunction. In this embodiment, Fuzzy Logic Analyzer 48CA is essentially functionally incorporated into Neural Network 48CB and is initially configured for the anticipated conditions and characteristics of transmission in the Connections 18 of Network 10. As will be discussed below, Fuzzy Logic Analyzer 48CA will thereby provide the initial training "knowledge" for Neural Network 48CB.

In operation, Fuzzy Logic Analyzer 48CA and a Neural Network 48CB receive either or both of Network Conditions 42 and Condition Records 20R from either or both of Packet Transfer Engine (PTE) 20TS and Packet Transfer Engine (PTE) 20TR, depending upon the type of current data transfer and the current test mode employed and will receive Transfer Requests 46. The Combined Analyzer 48C will, in turn, generate Packet Control 36A outputs identifying an Optimum Packet Size 36S and an Optimum Inter-Packet Interval 36I and will provide the Packet Control 36A outputs to the Collector/Controller (C/C) 20C. Collector/Controller (C/C) 20C will, in turn, provide the Packet Control 36 outputs to either or both of the involved Packet Transfer Engine (PTE) 20TS and Packet Transfer Engine 30TR.

In the initial stages of operation, that is, before Neural Network 48CB has been trained to the current Connection 18, the Packet Control 36 outputs of Fuzzy Logic Analyzer 48CA will be used, together with the Network Condition 42 information from either or both of Packet Transfer Engine (PTE) 20TS and Packet Transfer Engine (PTE) 20TR, to train Neural Network 48CB. Thereafter, Fuzzy Logic Analyzer 48CA and Neural Network 48CB will generate Packet Control 36 outputs in response to Network Condition 42 inputs from Packet Transfer Engine (PTE) 20TS and Packet Transfer Engine (PTE) 20TR.

In this regard, the Packet Control 36A outputs of Fuzzy Logic Analyzer 48CA will be the primary control inputs to Collector/Controller (C/C) 20C during those periods when the data transmission characteristics and conditions of Network 10 and Connection 16 are relatively stable because of the generally faster response of Fuzzy Logic Analyzer 48CA, that is, during those periods during which the ranges of values of Network Conditions 42 and Condition Records 40R are relatively stable. Should the Network 10 or Connection 16 conditions and characteristics change beyond the effective range of response of Fuzzy Logic Analyzer 48CA, as will be indicated by an increase in the latency or jitter experienced by Packets 16, the Packet Control 36A outputs of Neural Network 48CB will assume control of Collector/Controller (C/C) 20C. It will be appreciated that this changeover of control from Fuzzy Logic Analyzer 48CA to Neural Network 48CB may be implemented in a number of ways, such as an internal logic disabling of the outputs of Fuzzy Logic Analyzer 48CA should the latency or jitter experienced by Packets 16 of Monitor Packets 16M exceed a predetermined limit, as reflected in Network Conditions 42 or Condition Records 40R. In this case, Neural Network 48CB will both generate the controlling Packet Control 36A outputs and will enter a self-learning mode wherein the learning processes of Neural Network 48CB adapt to the new transmission conditions and characteristics of Network 10 and Connections 18. During this time, Neural Network 48CB will generate Update 50U outputs to Fuzzy Logic Analyzer 48CA, wherein the Update 50U inputs will be used by Fuzzy Logic Analyzer 48CA to update the sets and subsets of network characteristics and defined membership regions therein until the performance of Fuzzy Logic Analyzer 48CA is comparable with that of Neural Network 48CB. It will be understood that this reverse changeover of control will typically occur some time after the data transmission characteristics and conditions of Network 10 and Connection 16 have once again become relatively stable. At this time, Fuzzy Logic Analyzer 48CA may assume primary control of Collector/Controller (C/C) 20C.

Considering a present example of a back propagation neural network as may be implemented as a Neural Network 48B or as a Neural Network 48CB in a Combined Analyzer 48C, such a neural network may be implemented in three layers, respectively designated as the input layer, the middle layer and the output layer. The input layer receives as inputs variable representing and comprising the information from which the neural network is to generate Packet Control 36A outputs and these variables will preferably comprise the minimum number of variable necessary to predict an Optimum Packet Size 36S and an Optimum Inter-Packet Interval 36I. In a present embodiment, for example, the input layer may receive the information regarding transfer type and volume of data from a Transfer Request 46. The middle layer, in turn, is comprised of weighted neurons to perform the majority of operations necessary to determine the Optimum Packet Size 36S and Optimum Inter-Packet 36I values, while the output layer generates the actual Optimum Packet Size 36S and Optimum Inter-Packet 36I values as a Packet Control 36 output. Other inputs to the neural network will typically include training input, such as Network Conditions 42 and Condition Records 40R representing the performance, condition and characteristics of the Connection 16. These inputs comprise a criteria by which the neural network may evaluate the generation of the Packet Control 36A outputs, and by which the neural network may "learn".

Lastly, it will be understood by those of ordinary skill in the relevant arts that an Adaptive Packet Mechanism 20 may perform the above described operations for a plurality of Connections 18 concurrently, each comprising a transmission path through a Network 10 between a Sending Node 12S and a Receiving Node 12R. In other embodiments, and depending upon the configuration of the implementation of an Adaptive Packet Mechanism 20, the Sending Nodes 12S and Receiving Nodes 12R of a Network System 10 may include a plurality of Adaptive Packet Mechanisms 20, each operating between one or more pairs or groupings of Sending Nodes 12S and Receiving Nodes 12R and managing one or more Connections 18. Lastly, and as described, a Collector/Controller (C/C) 20C need not reside in a Node 12 containing a Packet Transfer Engine (PTE) 20T, but may reside in a Node 12 separate from Sending Nodes 12S and Receiving Nodes 12R.

While the invention has been particularly shown and described with reference to preferred embodiments of the apparatus and methods thereof, it will be also understood by those of ordinary skill in the art that various changes, variations and modifications in form, details and implementation may be made therein without departing from the spirit and scope of the invention as defined by the appended claims. Therefore, it is the object of the appended claims to cover all such variation and modifications of the invention as come within the true spirit and scope of the invention.

What is claimed is:

1. A method for optimizing data packet transmission through a connection between a sending node and a receiving node in a data communication network, comprising the steps of:
   (a) periodically determining current network conditions in the connection between the sending node and the receiving node wherein the network conditions pertain to the latency and jitter of packet transmission between the sending node and receiving node, and
   (b) determining from the current network conditions an optimum packet size and an optimum inter-packet interval for transmission of packet data between the sending node and the receiving node.

2. The method for optimizing data packet transmission through a connection between a sending node and a receiving node of claim 1, wherein in step (b) further includes:

(1) determining the optimum packet size and the optimum inter-packet interval for transmission of packet data between the sending node and the receiving node for a given amount and type of data to be communicated between the sending node and the receiving node.

3. The method for optimizing data packet transmission through a connection between a sending node and a receiving node of claim 1, wherein step (a) further includes the steps of:
 (a1) transmitting a sequence of monitor packets of a selected size from the sending node to the receiving node at a selected inter-packet interval,
 (a2) in the receiving node, reflecting the monitor packets from the receiving node to the sending node in the sequence in which the monitor packets are received at the sending node, and
 (a3) in the sending node and upon receiving the reflected monitor packets from the receiving node, determining network conditions in the connection between the sending node and the receiving node wherein the network conditions pertain to the latency and jitter of packet transmission between the sending node and receiving node for monitor packets of a known size and known inter-packet transmission interval.

4. The method for optimizing data packet transmission through a connection between a sending node and a receiving node of claim 3, wherein:
 each monitor packet includes
 a departure time representing a time the monitor packet was transmitted from the sending node, a packet size representing a size of the monitor packet and a packet number representing a numerical position of the monitor packet in the sequence of monitor packets.

5. The method for optimizing data packet transmission through a connection between a sending node and a receiving node of claim 4, wherein:
 (1) the network conditions determined through the monitor packets include a maximum two way delay time for the transmission and reflection of a monitor packet, a minimum two way delay time for the transmission and reflection of a monitor packet, an average two way delay time for the monitor packets, an average jitter of the monitor packets, and a number of packets out of sequence.

6. The method for optimizing data packet transmission through a connection between a sending node and a receiving node of claim 5, wherein the network conditions determined through the monitor packets further include:
 (2) a number of packets lost.

7. The method for optimizing data packet transmission through a connection between a sending node and a receiving node of claim 3, wherein:
 (1) the network conditions determined through the monitor packets include an available bandwidth and a jitter of the connection.

8. The method for optimizing data packet transmission through a connection between a sending node and a receiving node of claim 7, wherein:
 the network conditions determined through the monitor packets further include an average jitter, a maximum jitter and a minimum jitter.

9. The method for optimizing data packet transmission through a connection between a sending node and a receiving node of claim 3, wherein:
 the network conditions determined through the monitor packets further include a sequence in which the monitor packets are received at the receiving node.

10. The method for optimizing data packet transmission through a connection between a sending node and a receiving node of claim 3, wherein:
 the network conditions determined through the monitor packets further include a number of monitor packets lost.

11. The method for optimizing data packet transmission through a connection between a sending node and a receiving node of claim 1, further comprising the step of:
 (c) transmitting data packets from the sending node to the receiving node with packet sizes and at inter-packet intervals determined according to the network conditions.

12. The method for optimizing data packet transmission through a connection between a sending node and a receiving node of claim 1, further comprising the steps of:
 (a1) transmitting a sequence of monitor packets from the sending node to the receiving node,
 (a2) in the receiving node, reflecting the monitor packets from the receiving node to the sending node in the sequence in which the monitor packets are received at the sending node, and
 (a3) in the sending node and upon receiving the reflected monitor packets from the receiving node, determining network conditions in the connection between the sending node and the receiving node wherein the network conditions pertain to the latency and jitter of packet transmission between the sending node and receiving node for monitor packets of a known size and known inter-packet transmission interval, and
 (c) in the sending node and from the network conditions, determining an optimum packet size and an optimum inter-packet interval for transmitting packets from the sending node to the receiving node.

13. The method for optimizing data packet transmission through a connection between a sending node and a receiving node of claim 12, further comprising the steps of:
 (d) in the receiving node, determining network conditions from the received monitor packets.

14. The method for optimizing data packet transmission through a connection between the sending node and the receiving node of claim 13, further comprising the steps of:
 (e) in the receiving node, storing the network conditions in one or more condition records.

15. The method for optimizing data packet transmission through a connection between a sending node and a receiving node of claim 13, further comprising the steps of:
 (d) returning the network conditions determined in the receiving node to the sending node, and
 (e) in the sending node, updating the optimum packet size and inter-packet interval using the network conditions determined in the receiving node.

16. A method for optimizing data packet transmission through a connection between a sending node and a receiving node in a data communication network, comprising the steps of:
 (a) transmitting packets from the sending node to the receiving node,
 (b) in the receiving node and for each packet received from the sending node, generating and transmitting to the sending node an acknowledgment of receipt of the packet, and
 (c) in the sending node and upon receiving the acknowledgments of packets from the receiving node, determining network conditions in the connection between the sending node and the receiving node wherein the network conditions pertain to the latency and jitter of packet transmission between the sending node and receiving node for monitor packets of a known size and known inter-packet transmission interval, and (c) in the receiving node and from the network conditions, determining an optimum packet size and optimum inter-packet interval for transmission of data packets to the receiving node.

17. A method for optimizing data packet transmission through a connection between a sending node and a receiving node in a data communication network, comprising the steps of:

(a) transmitting a sequence of data packets from the sending node to the receiving node, (b) in the receiving node, determining network conditions in the connection between the sending node and the receiving node from the received data packets, wherein the network conditions pertain to the latency and jitter of packet transmission between the sending node and receiving node, (c) returning the network conditions determined in the receiving node to the sending node, and (d) in the sending node, using the network conditions determined in the receiving node to determine an optimum packet size and an optimum inter-packet interval for the transmission of data packets from the sending node to the receiving node.

18. An adaptive packet mechanism for optimizing data packet transmission through a connection between a sending node and a receiving node in a data communication network, comprising:

(a) a sending node packet transfer engine and a receiving node packet transfer engine communicating through the connection for periodically determining current network conditions in the connection between the sending node and the receiving node wherein the network conditions pertain to the latency and jitter of packet transmission between the sending node and receiving node, and (b) a collector/controller for determining from the current network conditions an optimum packet size and an optimum inter-packet interval for transmission of packet data between the sending node and the receiving node.

19. The adaptive packet mechanism for optimizing data packet transmission through a connection between a sending node and a receiving node in a data communication network of claim 18, wherein:

(1) the collector/controller determines the optimum packet size and the optimum inter-packet interval for transmission of packet data between the sending node and the receiving node for a given amount and type of data to be communicated between the sending node and the receiving node.

20. The adaptive packet mechanism for optimizing data packet transmission through a connection between a sending node and a receiving node in a data communication network of claim 18, wherein:

(a1) the sending node packet transfer engine is responsive to the collector/controller for transmitting a sequence of monitor packets of a selected size from the sending node to the receiving node at a selected inter-packet interval, (a2) the receiving node packet transfer engine is responsive to monitor packets received from the sending node for reflecting the monitor packets from the receiving node to the sending node in the sequence in which the monitor packets are received at the sending node, and (a3) the sending node packet transfer engine is responsive to reflected monitor packets received from the receiving node for determining network conditions in the connection between the sending node and the receiving node wherein the network conditions pertain to the latency and jitter of packet transmission between the sending node and receiving node for monitor packets of a known size and known inter-packet transmission interval.

21. The adaptive packet mechanism for optimizing data packet transmission through a connection between a sending node and a receiving node in a data communication network of claim 20, wherein:

each monitor packet includes
a departure time representing a time the monitor packet was transmitted from the sending node, a packet size representing a size of the monitor packet and a packet number representing a numerical position of the monitor packet in the sequence of monitor packets.

22. The adaptive packet mechanism for optimizing data packet transmission through a connection between a sending node and a receiving node in a data communication network of claim 21, wherein:

(1) the network conditions determined through the monitor packets include a maximum two way delay time for the transmission and reflection of a monitor packet, a minimum two way delay time for the transmission and reflection of a monitor packet, an average two way delay time for the monitor packets, an average jitter of the monitor packets, and a number of packets out of sequence.

23. The adaptive packet mechanism for optimizing data packet transmission through a connection between a sending node and a receiving node in a data communication network of claim 22, wherein the network conditions determined through the monitor packets further include:

(2) a number of packets lost.

24. The adaptive packet mechanism for optimizing data packet transmission through a connection between a sending node and a receiving node in a data communication network of claim 20, wherein:

(1) the network conditions determined through the monitor packets include an available bandwidth and a jitter of the connection.

25. The adaptive packet mechanism for optimizing data packet transmission through a connection between a sending node and a receiving node in a data communication network of claim 24, wherein:

the network conditions determined through the monitor packets further include an average jitter, a maximum jitter and a minimum jitter.

26. The adaptive packet mechanism for optimizing data packet transmission through a connection between a sending node and a receiving node in a data communication network of claim 20, wherein:

the network conditions determined through the monitor packets further include a sequence in which the monitor packets are received at the receiving node.

27. The adaptive packet mechanism for optimizing data packet transmission through a connection between a sending node and a receiving node in a data communication network of claim 20, wherein:

the network conditions determined through the monitor packets further include a number of monitor packets lost.

28. The adaptive packet mechanism for optimizing data packet transmission through a connection between a sending node and a receiving node in a data communication network of claim 18, wherein:
  (c) the sending node packet transfer engine is responsive to the optimum packet size and inter-packet interval determined by the collector/controller for transmitting data packets from the sending node to the receiving node with packet sizes and at inter-packet intervals determined according to the network conditions.

29. The adaptive packet mechanism for optimizing data packet transmission through a connection between a sending node and a receiving node in a data communication network of claim 18, wherein:
  (d) the receiving node packet transfer engine is responsive to monitor packets received from the sending node for determining network conditions from the received monitor packets.

30. The adaptive packet mechanism for optimizing data packet transmission through a connection between a sending node and a receiving node in a data communication network of claim 29, wherein:
  (e) the receiving node packet transfer engine is responsive to the monitor packets received from the sending node for storing the network conditions in one or more condition records.

31. The adaptive packet mechanism for optimizing data packet transmission through a connection between a sending node and a receiving node in a data communication network of claim 30, wherein:
  (e) the receiving node packet transfer engine is responsive to the monitor packets received from the sending node for providing the network conditions determined in the receiving node to the collector/controller, and
  (f) the collector/controller is responsive to the network conditions determined in the receiving node for updating the optimum packet size and inter-packet interval using the network conditions determined in the receiving node.

32. An adaptive packet mechanism for optimizing data packet transmission through a connection between a sending node and a receiving node in a data communication network, comprising:
  (a) a sending node packet transfer engine for transmitting packets from the sending node to the receiving node,
  (b) a receiving node packet acknowledgment mechanism responsive to each packet received in the receiving node from the sending node for generating and transmitting to the sending node packet transfer engine an acknowledgment of receipt of the packet,
  (c) the sending node packet transfer engine being responsive to the acknowledgments of packets from the receiving node for determining network conditions in the connection between the sending node and the receiving node wherein the network conditions pertain to the latency and jitter of packet transmission between the sending node and receiving node for monitor packets of a known size and known inter-packet transmission interval, and
  (e) a collector/controller responsive to the network conditions determining an optimum packet size and optimum inter-packet interval for transmission of data packets to the receiving node.

33. An adaptive packet mechanism for optimizing data packet transmission through a connection between a sending node and a receiving node in a data communication network, comprising:
  (a) a sending node packet transfer engine for transmitting a sequence of data packets from the sending node to the receiving node,
  (b) a receiving node packet transfer engine for determining network conditions in the connection between the sending node and the receiving node from the received data packets, wherein the network conditions pertain to the latency and jitter of packet transmission between the sending node and receiving node, and
  (d) a collector/controller responsive to the network conditions determined by the receiving node packet transfer engine for determining an optimum packet size and an optimum inter-packet interval for the transmission of data packets from the sending node to the receiving node.

* * * * *